(12) United States Patent
Park et al.

(10) Patent No.: US 11,327,737 B2
(45) Date of Patent: May 10, 2022

(54) BUILDING MANAGEMENT SYSTEM WITH CLOUD MANAGEMENT OF GATEWAY CONFIGURATIONS

(71) Applicant: Johnson Controls Technology Company, Auburn Hills, MI (US)

(72) Inventors: Youngchoon Park, Brookfield, WI (US); Sudhi R. Sinha, Milwaukee, WI (US); Erik S. Paulson, Madison, WI (US); Errol Trunch, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 182 days.

(21) Appl. No.: 16/775,032

(22) Filed: Jan. 28, 2020

(65) Prior Publication Data

US 2020/0167148 A1 May 28, 2020

Related U.S. Application Data

(63) Continuation-in-part of application No. 15/494,403, filed on Apr. 21, 2017, now Pat. No. 10,868,857.
(Continued)

(51) Int. Cl.
*G06F 8/65* (2018.01)
*G05B 19/042* (2006.01)

(52) U.S. Cl.
CPC .............. *G06F 8/65* (2013.01); *G05B 19/042* (2013.01); *G05B 2219/25011* (2013.01)

(58) Field of Classification Search
CPC ...... G06F 9/4411; G06F 8/63; H04L 12/2807; G05B 2219/25011; G05B 2219/2642
See application file for complete search history.

(56) References Cited

U.S. PATENT DOCUMENTS 8,971,173 B1 3/2015 Choudhury et al.
10,291,477 B1 * 5/2019 Askar ................. H04L 41/0809
(Continued)

FOREIGN PATENT DOCUMENTS

WO WO-2013/006219 1/2013

OTHER PUBLICATIONS

Swan, The Language of BACnet-Objects, Properties and Services, http://www.bacnet.org/Bibliography/ES-7-96/ES-7-96.htm, retrieved on Apr. 21, 2017, 11 pages.

*Primary Examiner* — John M MacIlwinen
(74) *Attorney, Agent, or Firm* — Foley & Lardner LLP

(57) ABSTRACT

A building device including one or more memory devices configured to store instructions thereon, that, when executed by one or more processors, cause the one or more processors to implement a software gateway configured to receive one or more messages from building equipment, receive, based on the one or more messages, one or more software updates for the software gateway, wherein the one or more software updates are updates for communicating with the building equipment, communicate with the building equipment based on the one or more software updates and receive data describing the building equipment, and cause a configuration image to be generated for the software gateway based on the data describing the building equipment, the configuration image indicating a configuration of the software gateway for performing one or more gateway services.

20 Claims, 18 Drawing Sheets

Related U.S. Application Data

(60) Provisional application No. 62/798,429, filed on Jan. 29, 2019.

(56) References Cited

U.S. PATENT DOCUMENTS

| | | | |
|---|---|---|---|
| 10,684,845 B2* | 6/2020 | Vangeel | G06F 8/65 |
| 2002/0019725 A1 | 2/2002 | Petite | |
| 2007/0070888 A1 | 3/2007 | Raman et al. | |
| 2007/0258508 A1 | 11/2007 | Werb et al. | |
| 2011/0013516 A1 | 1/2011 | Black et al. | |
| 2013/0015955 A1 | 1/2013 | Luong | |
| 2014/0215642 A1 | 7/2014 | Huxham | |
| 2014/0301406 A1 | 10/2014 | Le Tutour | |
| 2015/0293508 A1 | 10/2015 | Piaskowski et al. | |
| 2016/0165663 A1* | 6/2016 | Shanmugam | H04W 76/10 370/338 |
| 2017/0064042 A1* | 3/2017 | Vora | H04W 4/70 |
| 2017/0118067 A1 | 4/2017 | Vedula | |
| 2017/0164417 A1* | 6/2017 | Kress | H04W 48/16 |
| 2017/0180395 A1 | 6/2017 | Stransky-Heilkron | |
| 2017/0195318 A1* | 7/2017 | Liu | H04L 67/10 |
| 2017/0293293 A1 | 10/2017 | Brownie et al. | |
| 2017/0344357 A1* | 11/2017 | Su | G06F 8/71 |
| 2018/0109395 A1* | 4/2018 | Berdy | H04W 4/50 |
| 2018/0253569 A1 | 9/2018 | Swierk et al. | |

\* cited by examiner

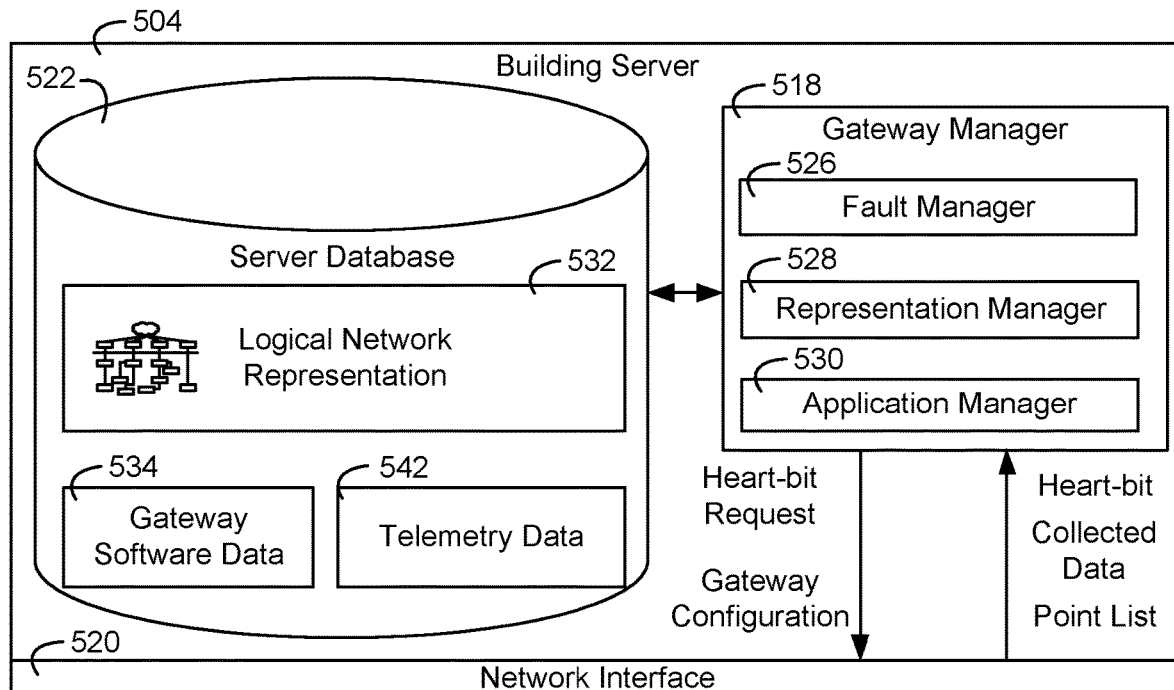
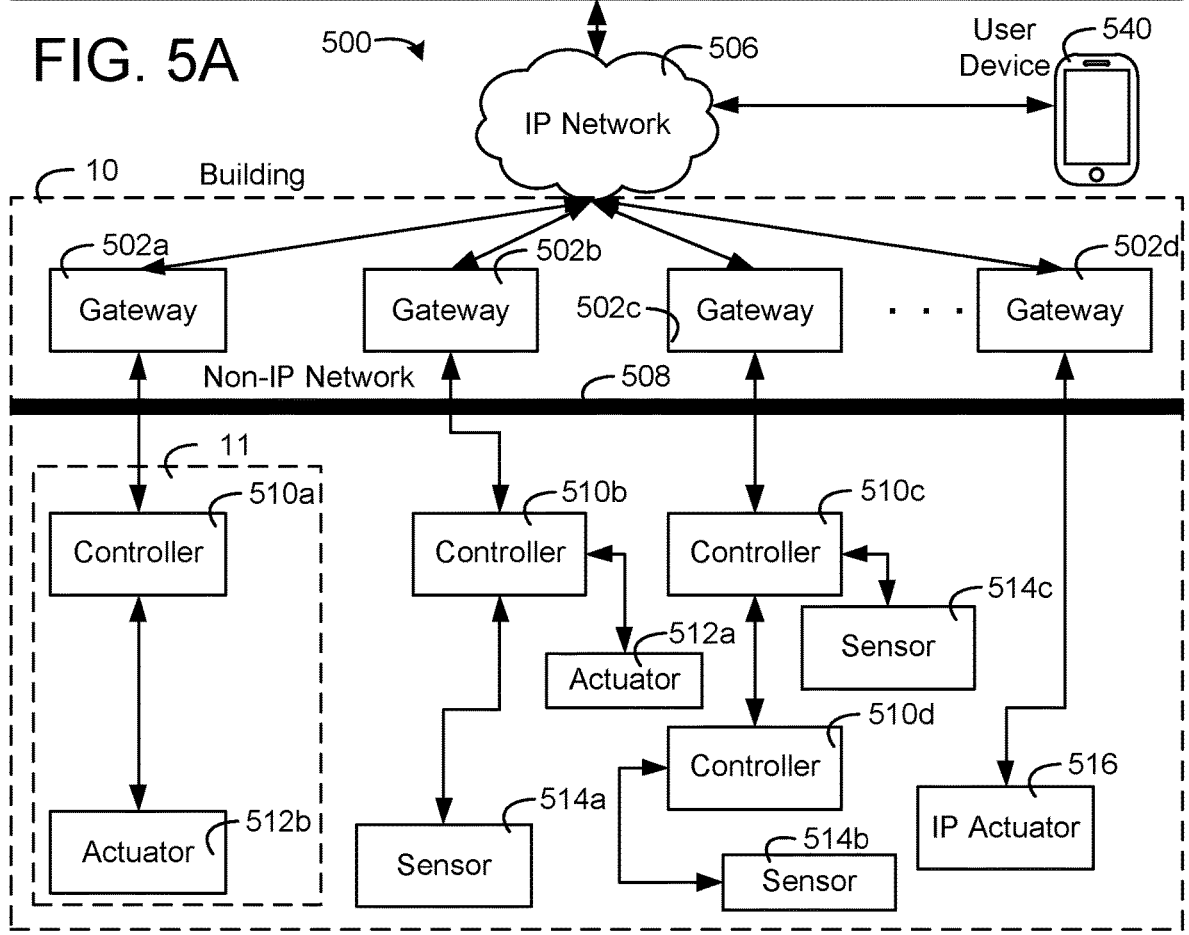
FIG. 5A

1300

Gateway Object

| Unique identifier 1402 | Ucis-2327-2127-sded-iesa |
| --- | --- |
| Signature 1404 | 7b1c018bf975c88fbe9df6292bf370b1 |
| Gateway ||
| Description 1406 | Metasys Energy Gateway |
| Identifier 1408 | abcd-edfs-aesd-2322 |
| LAN 1410 | 10.3.2.1 |
| Subnet 1412 | 10.0.0.1 |
| Gateway 1414 | 10.9.9.1 |
| Software Version 1416 | 1.2 |
| ⋮ ||
| Customer ||
| Name 1418 | JCI |
| Site 1420 | JCI BE HQ |
| Version 1422 | 1.02 |
| Stat ||
| Point Subscription 1424 | 12032 |
| Data Volume 1426 | 32M |

Point Object

| Point Object 1 1432 ||
| --- | --- |
| Object identifier 1434 | Analog input #1101 |
| Description 1436 | Return air temperature |
| Device Type 1438 | Thermistor |
| Units 1440 | Fahrenheit |
| Update Interval 1442 | 15 Minutes |

FIG. 14B

BUILDING MANAGEMENT SYSTEM WITH CLOUD MANAGEMENT OF GATEWAY CONFIGURATIONS

CROSS-REFERENCE TO RELATED PATENT APPLICATIONS

This application claims the benefit of, and priority to, U.S. Provisional Patent Application No. 62/798,429 filed Jan. 29, 2019. This application is also a continuation-in-part of U.S. patent Ser. No. 15/494,403 filed Apr. 21, 2017. The entirety of each of these patent applications is incorporated by reference herein.

BACKGROUND

Gateways in buildings act as links between two or more networks (e.g., a first network and a second network). Gateways can translate between various network protocols to act as a network link for devices connected to the gateway via one of the two or more networks. Gateways can act as isolated network links, and thus, devices connected to a gateway can be dependent on the functionality of a single gateway to be connected to a particular network. If a gateway goes offline or experiences a fault, all of the devices connected to the gateway may go offline. Further, a gateway typically needs at least one device driver in order to successfully communicate with connected devices. However, the number and types of devices connected to the gateway varies depending on the specific environment in which the gateway is installed. Accordingly, the gateway may need several types of device drivers to properly operate.

SUMMARY

One implementation of the present disclosure is a building device including one or more memory devices configured to store instructions thereon, that, when executed by one or more processors, cause the one or more processors to implement a software gateway, the software gateway configured to receive one or more messages from building equipment connected to the software gateway, receive, based on the one or more messages, one or more software updates for the software gateway, wherein the one or more software updates are updates for communicating with the building equipment, communicate with the building equipment based on the one or more software updates and receive data describing the building equipment, and cause a configuration image to be generated for the software gateway based on the data describing the building equipment, the configuration image indicating a configuration of the software gateway for performing one or more gateway services for the building equipment.

In some embodiments, the software gateway is configured to cause the configuration image to be generated by at least one of generating the configuration image locally on the software gateway or communicating the configuration of the software gateway to a server, wherein the server generates the configuration image based on the configuration of the software gateway.

In some embodiments, the building equipment include at least one of building controllers, building sensor devices, or building actuator devices.

In some embodiments, the one or more software updates are one or more communication protocol drivers for communicating with the building equipment via one or more communication protocols.

In some embodiments, the configuration image includes at least one of a list of points of the building equipment assigned to the software gateway, a communication configuration for communicating with the building equipment, or a network address information of the software gateway.

In some embodiments, the software gateway is configured to receive, based on the one or more messages, the one or more software updates by identifying, based on the one or more messages, the one or more software updates and retrieving, from a server, the one or more software updates identified based on the one or more messages.

In some embodiments, the one or more pieces of building equipment are associated with one or more points. In some embodiments, the software gateway is configured to receive, from a server, a second configuration image of a second software gateway, wherein the second software gateway has experienced a failure and manage, based on the second configuration image, one or more second points of one or more second pieces of building equipment in response to a reception of the second configuration image, wherein the second configuration image identifies the one or more second points.

In some embodiments, the software gateway is configured to retrieve, based on the second configuration image, one or more second software updates and install the one or more second software updates. In some embodiments, the software gateway is configured to manage the one or more second points of the one or more second pieces of building equipment based on the one or more second software updates.

In some embodiments, the software gateway is configured to communicate the configuration image to a server, wherein the server includes an image repository including a plurality of configuration images of a plurality of software gateways.

In some embodiments, the software gateway is configured to cause the server to update a previous configuration image of the software gateway stored in the image repository with the configuration image communicated to the server by the software gateway.

Another implementation of the present disclosure is a method of a software gateway of a building implemented on one or more processing circuits, the method including receiving, by the software gateway, one or more messages from building equipment connected to the software gateway, receiving, by the software gateway, based on the one or more messages, one or more software updates for the software gateway, wherein the one or more software updates are updates for communicating with the building equipment, communicating, by the software gateway, with the building equipment based on the one or more software updates and receive data describing the building equipment, and causing, by the software gateway, a configuration image to be generated for the software gateway based on the data describing the building equipment, the configuration image indicating a configuration of the software gateway for performing gateway services for the building equipment.

In some embodiments, causing, by the software gateway, the configuration image to be generated comprises at least one of generating the configuration image locally on the software gateway or communicating the configuration of the software gateway to a server, wherein the server generates the configuration image based on the configuration of the software gateway.

In some embodiments, the building equipment include at least one of building controllers, building sensor devices, or building actuator devices.

In some embodiments, the one or more software updates are one or more communication protocol drivers for communicating with the building equipment via one or more communication protocols.

In some embodiments, the configuration image includes at least one of a list of points of the building equipment assigned to the software gateway, a communication configuration for communicating with the building equipment, or a network address information of the software gateway.

In some embodiments, receiving, by the software gateway, the one or more software updates includes identifying, based on the one or more messages, the one or more software updates and retrieving, from a server, the one or more software updates identified based on the one or more messages.

In some embodiments, the method further includes causing, by the software gateway, a server to update a previous configuration image of the software gateway stored in an image repository of the server with the configuration image communicated to the server by the software gateway.

In some embodiments, the one or more pieces of building equipment are associated with one or more points. In some embodiments, the method further includes receiving, by the software gateway, from a server, a second configuration image of a second software gateway, wherein the second software gateway has experienced a failure and managing, by the software gateway, based on the second configuration image, one or more second points of one or more second pieces of building equipment in response to a reception of the second configuration image, wherein the second configuration image identifies the one or more second points.

In some embodiments, the method further includes retrieving, by the software gateway, based on the second configuration image, one or more second software updates and installing, by the software gateway, the one or more second software updates. In some embodiments, the software gateway is configured to manage the one or more second points of the one or more second pieces of building equipment based on the one or more second software updates.

Another implementation of the present discourse are one or more computer storage medium configured to store instructions thereon, that, when executed by one or more processors, cause the one or more processors to implement a software gateway, the software gateway configured to receive one or more messages from building equipment connected to the software gateway, the one or more messages associated with one or more points of the building equipment, receive, based on the one or more messages, one or more software updates for the software gateway, wherein the one or more software updates are updates for communicating with the building equipment, communicate with the building equipment based on the one or more software updates and receive data describing the building equipment and cause a configuration image to be generated for the software gateway based on the data describing the building equipment, the configuration image indicating a configuration of the software gateway for performing gateway services for the building equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 5A is a diagram of a building server connected to controllers, actuators, and sensors via gateways in the building of FIGS. 1-3, according to some embodiments.

FIG. 14A is a diagram of a data object for the gateways of FIG. 5A, according to some embodiments.

FIG. 14B is a diagram of a BACnet object for a data point of one of the devices, controllers, and sensors of FIGS. 5A-5B, according to some embodiments.

DETAILED DESCRIPTION

Overview

Referring generally to the FIGURES, a software-defined gateway for use in a building management system (BMS) is described, according to various embodiments. The software-defined gateway provides a connection between a variety of building devices (e.g., sensors, actuators, controllers) and a wireless network (e.g., the Internet). The connected devices within a building may operate using a variety of different communications protocols. For example, a building may have relatively new devices as well as legacy devices. The software-defined gateway can be connected to a cloud platform (e.g., one or more remote servers) in order to access and download appropriate device drivers used to communicate with various types of devices. This functionality allows the software-defined gateway to be flexible such that it can dynamically facilitate communications between a wide variety of devices. Without such a software-defined gateway, device drivers would need to be manually downloaded to devices such as controllers in a building.

Building with Distributed Edge Devices

Figure 1:
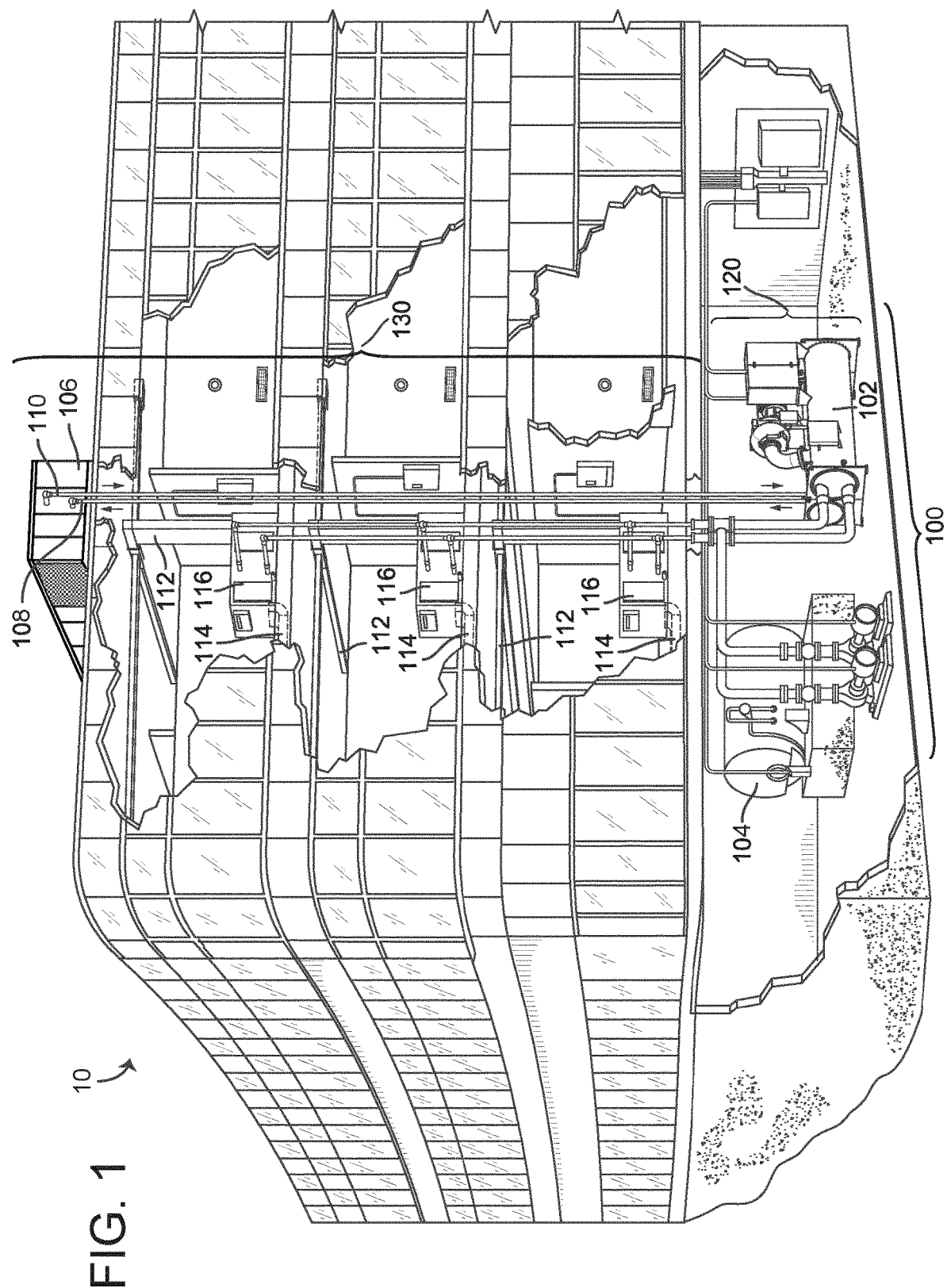
FIG. 1 is a schematic drawing of a building equipped with a HVAC system, according to some embodiments.

Referring now to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
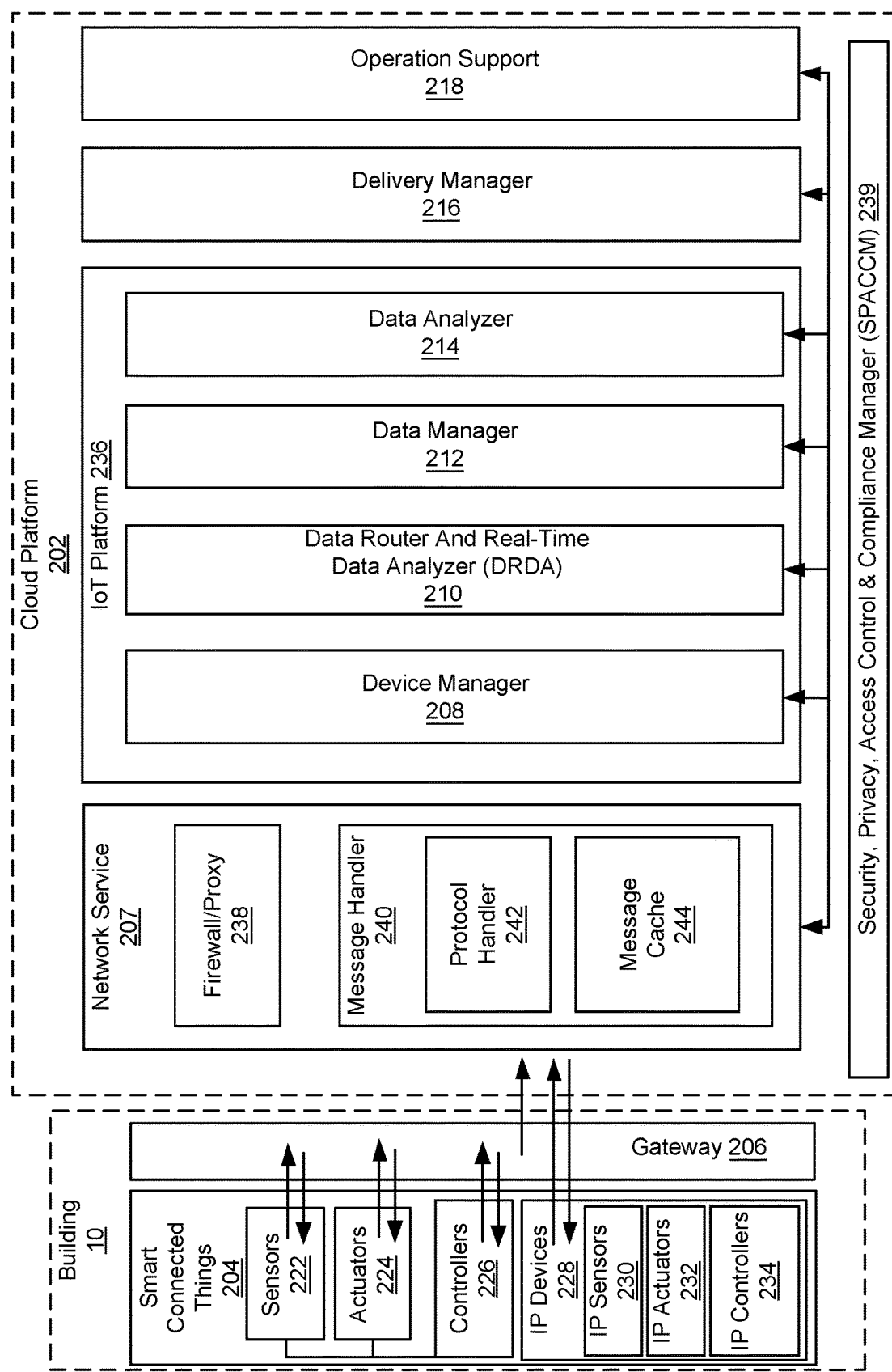
FIG. 2 is a block diagram of a system of HVAC equipment in the building of FIG. 1 communicating to a cloud platform, according to some embodiments.

Referring now to FIG. 2, system 200 is shown to include devices of building 10 coupled to a cloud platform 202, according to an exemplary embodiment. Cloud platform 202 may be one or more controllers, servers, and/or any other computing device that may be located in building 10 and/or may be located remotely and/or connected to the systems of building 10 via networks (e.g., the Internet). Cloud platform 202 can be configured to cause building 10 and the devices of building 10 to be a "self-conscious building." A self-conscious building may be a building in which building devices are interconnected via a cloud, e.g., cloud platform 202. A building of interconnected devices may be "self-conscious" in the regard that rather than having a specific controller make specific decisions for only a portion of the equipment in building 10, cloud platform 202 may receive and aggregate data from all devices of building 10 and thus make decisions for building 10 based on an aggregate set of data.

In FIG. 2, cloud platform 202 includes various services and components in some embodiments. Cloud platform 202 includes network service 207, Internet of Things (IoT) platform 236, delivery manager 216, and operation support 218 in some embodiments. System 200 is shown to include smart connected things 204. Smart connected things 204 includes sensors 222, actuators 224, controllers 226, and IP devices 228. Smart connected things 204 may include actuators, dampers, chillers, heaters, rooftop units (RTUs), thermostats and air handling units (AHUs), or any other type of equipment or device that can be installed within a building (e.g., fans, pumps, valves, etc.). Sensors 222 can include one or more devices that can be configured to measure various environmental conditions (e.g., light intensity, occupancy, temperature, humidity, air quality, etc.). Actuators 224 can be any device that can be configured to affect an environmental change in building 10 (e.g., maintain a setpoint in building 10, maintain an air quality level in building 10, etc.).

Controllers 226 can be any device that can be connected to sensors 222 and actuators 224. Controllers 226 can be configured to operate actuators 224 and/or collect data from sensors 222. In this regard, controllers 226 can be configured to collect data from sensors 222 and control actuators 224 based on the data received from sensors 222. Sensors 222, actuators 224, and controllers 226 may not be configured to communicate via an IP based network but may be configured to communicate with each other via a non-IP based network. In this regard, sensors 222, actuators 224, and controllers 226 may not be able to communicate directly with cloud platform 202 since the device are not Internet enabled but must communicate with cloud platform 202 via gateway 206. Cloud platform 202 can be configured to communicate via both non-IP based networks and IP based networks.

IP devices 228 can be any device in building 10 that is connected to cloud platform 202 via an IP based network. In this regard, IP devices 228 can include the hardware and/or software necessary to communicate via an IP based network. IP devices 228 can be configured to communicate directly to cloud platform 202 rather than communicating to cloud platform 202 via gateway 206. IP devices 228 are shown to include IP sensors 230, IP actuators 232, and IP controllers 234. IP sensors 230 may be similar to sensors 222. However, IP sensors 230 may communicate directly with cloud platform 202 (e.g., IP sensors 230 can communicate via an IP based network). Further, IP actuators 232 can be similar to actuators 224 and/or IP controllers 234 may be similar to controllers 226. IP actuators 232 and/or IP controllers 234 can be configured to communicate directly to cloud platform 202 via an IP based network instead of communicating to cloud platform 202 via gateway 206.

Although some embodiments in the specification are described primarily with reference to HVAC equipment, it should be understood that the systems and methods described herein may be applicable to a wide variety of building equipment and other types of connected devices (e.g., HVAC equipment, LED lights, lighting systems mobile phones, elevator systems, fire safety systems, security systems, smart street lamps, cars, televisions, etc.) with embedded intelligence and communication capabilities.

Gateway 206 may be any kind of network gateway that can be configured to aggregate and enrich data received from smart connected things 204. Gateway 206 may be used to connect the equipment of smart connected things 204 among each other in addition to connecting smart connected things 204 to cloud platform 202. In this regard, the equipment of smart connected things 204 may be legacy equipment that may not have Internet connectivity, devices that may communicate via a non-IP based network, and/or be new equipment that does have Internet connectivity, equipment that can communicate via an IP based network. Gateway 206 can get, retrieve, query, and/or receive data from smart connected things 204 and/or control smart connected things 204 based on instructions or analytics results received from cloud platform 202. Gateway 206 may provide network security, access control, and unique address of legacy devices endpoints for remote access and protocol mediation services. In some embodiments, gateway 206 is a general-purpose gateway solution made by any of a variety of hardware manufacturers (e.g., INTEL®, FREESCALE®, DELL®, TEXAS INSTRUMENTS®, etc.). In other embodiments, gateway 206 is a network connection engine (NCE) or a mobile access portal (MAP) gateway used specifically to connect building automation systems and smart equipment. Gateway 206 may use various IP based protocols (e.g., Constrained Application Protocol (CoAP), Extensible Message and Presence Protocol (XMPP), Advanced Message Queuing Protocol (AMQP), Message Queue Telemetry Transport (MQTT), etc.) and web based common data exchange (e.g., Hypertext Transfer Protocol (HTTP), Representational State Transfer (RESTful), and Application Programming Interfaces (APIs)) to send data from smart connected things 204 to cloud platform 202.

Network service 207 may provide access to the Internet and/or may include and/or provide access to other types of data networks, such as a local area network (LAN), a wide area network (WAN), a cellular network, a satellite network, a radio network, or any other type of data network or combination thereof. Network service 207 is shown to include a firewall/proxy 238, protocol handler 242, message handler 240, and message cache 244. Network service 207 may include any number of computing devices (e.g., computers, servers, routers, network switches, etc.) configured to transmit, receive, or relay data. Network service 207 may further include any number of hardwired and/or wireless connections. For example, smart connected HVAC things 204 may communicate wirelessly (e.g., using a Wi-Fi or cellular radio, etc.) with a transceiver that is hardwired (e.g., via a fiber optic cable, a CATS cable, etc.) to a computing device of network service 207.

Network service 207 can include services that facilitate managing fixed or wireless communication with smart connected HVAC things 204. Network vendors may include, for example, cellular telecommunications providers (e.g., VERIZON®, T-MOBILE®, AT&T®, etc.) as well as Internet service providers. Communications via network service 207 may leverage enterprise contracts and partnerships to optimize the cost of data transmission. Many network carriers provide a secure connection option as a part of premium services. However, a similar degree of network securities can be achieved via employing trust platform chip in smart connected HVAC equipment 408 and using encrypted messaging such as AMQP via an IP based secure transport.

Firewall/proxy 238 can be any firewall and/or proxy which protects smart connect things 204 from hacking, spyware, malware, or other threats or computer viruses. In this regard, firewall/proxy 238 may allow smart connected things 204 to be connected to cloud platform 202 and/or the Internet while minimizing the risk that smart connected things 204 can be hacked and/or otherwise used by unauthorized persons who may attempt to access smart connected things 204 via the Internet or any other network. Message handler 240 can be configured to facilitate communicate between smart connected things 204 and cloud platform 202. For example, message handler 240 may be configured to send and/or receive data directly from IP devices 228 (e.g., IP sensors 230, IP actuators 232, and/or IP controllers 234). Further, message handler 240 can be configured to send and receive data indirectly from sensors 222, actuators 224, and/or controllers 226 via gateway 206.

Message handler 240 is shown to include protocol handler 242 and message cache 244. In some embodiments, protocol handler 242 can be configured to decode and/or otherwise process the data received from smart connected things 204 based on the network protocol used to transmit the data to cloud platform 202. Further, protocol handler 242 can send messages to smart connected tings 204 based on a particular network protocol. Message cache 244 can be any type of data cache (e.g., hardware and/or software component) that accounts for redundancies in messaging. For example, message cache 244 can be any type of network cache which stores data that is commonly accessed by and/or frequently sent to smart connected things 204. By storing the highly requested and/or highly transmitted data locally in message cache 244, the highly requested data does not need to be repeatedly requested from other various components of cloud platform 202.

System 200 is shown to include, security, privacy, access control, and compliance manager (SPACCM) 239. Security may be provided at both the device (e.g., smart connected things 204) and network levels (e.g., cloud platform 202). The same intelligence that enables devices to perform their tasks may also enable them to recognize and counteract threats. This may not require an evolutionary approach, but rather an evolution of measures that have proven successful in IT networks, adapted to the challenges of IoT and to the constraints of connected devices. At any given point in time, IoT platform 236 may support multiple users and stake holders including building owners, building operators, tenants, service technicians, manufacturers, and the like. Cloud platform 202 may allow remote accessibility of smart connected things 204 (e.g., via the Internet). For this reason, remote accessibility of connected products may involve complex identity management through a unified login and product management experience that can be facilitated by SPACCM 239. For example, a single login may allow a customer to sign on to all connected products and services associated with IoT platform 236.

Still referring to FIG. 2, cloud platform 202 is shown to include IoT platform 236. IoT platform 236 is shown to include device manager 208, data router and real-time data analyzer 210, data manager 212, and data analyzer 214. IoT platform 236 may include various large IoT solution providers such as MICROSOFT®, INTEL®, CISCO®, GOOGLE®, AMAZON®, SAP®, QUALCOMM®, and/or ORACLE® that offer general-purpose solutions with developer tools for customization in addition to AXEDA®, ETHERIOS®, THINGWORX®, and GENERAL ELECTRIC® (GE®) that offer integrated industry solutions. In some embodiments, IoT platform 236 leverages the industry's first on-premises, off-premises hybrid architecture, MICROSOFT AZURE®.

Device manager 208 can be configured to identify smart connected things 204. In some embodiments, device manager 208 identifies smart connected things 204 via a token sent by smart connected things 204 and/or via any other login credential. For example, the token may be an encrypted key that device manager 208 can decrypt. Based on the identity of a device of smart connected things 204, device manager 208 may allow the device to retrieve data and/or software stored by IoT platform 236. Device manager 208 can be further configured to generate control signals for smart connected things 204 and/or otherwise control the functionality of smart connected things 204.

Data router and real-time data analyzer (DRDA) 210 can be configured to route data in cloud platform 202 and/or to building 10 in addition to performing real-time data analytics. DRDA 210 can be configured to route messages received from smart connected things 204 to various components of cloud platform 202, devices of building 10, and/or other devices connected to the Internet. Further, DRDA 210 can be configured to perform complex event processing. DRDA 210 can be configured to infer (derive) events and/or event patterns based on data received from various data streams. The data streams may be data streams received from building 10, data streams received from cloud platform 202, data streams received from the Internet, and/or any other received data and/or data stream. Complex event processing may identify various events quickly (e.g., in real time). The events may be security threats, emergencies for building 10, and/or other events which cloud platform 202 needs to respond to quickly. For this reason, DRDA 210 can be configured to respond to any event which it determines needs a quick and/or immediate response.

Data manager 212 can include one or more databases, memory storage units, and/or any other hardware and software component that can store and/or manage information. Data manger 212 may include file systems such as Hadoop Distributed File System (HDFS), various databases such as key-value storage, relational database management systems (RDBMS), graph databases, various mapping structures and/or any other system for storing data. In various embodiments, data manager 212 can be configured to manage, organize, integrate, and store data, and/or send data to various components of cloud platform 202. For example, data manager 212 may generate various reports and/or combine (e.g., integrate) data from disparate devices in building 10, various components of cloud platform 202, and/or the Internet.

Data analyzer 214 can be configured to perform data processing on data received from smart connected things 204, various components of cloud platform 202, and the Internet. Data analyzer 214 can be configured to perform parallel data analytics on received data and in some embodiments and/or use a software framework such Hadoop to perform the data processing. Data analyzer 214 can be configured to generate business intelligence metrics. Business intelligence metrics may be generated based on the received data. In some embodiments, the business intelligence metrics indicate power consumption of a building, predicted operating costs of new equipment, equipment replacements, and/or any other intelligence metric that can be generated from the received data. Further, data analyzer 214 can be configured to perform data mining to determine various patterns in large data sets that data analyzer 214 may receive and/or collect. Further, data analyzer 214 can be configured to perform any kind of time series data analysis (e.g., data cleansing, data extrapolation, interpolation, averaging). Time series data analysis may be, for example, temperatures of a zone collected by sensors of building 10 e.g., sensors 22. For example, data analyzer 214 may "cleanse" the time series data by compressing the data points based on an upper threshold and/or a lower threshold.

Cloud platform 202 includes delivery manager 216 in some embodiments. Delivery manager 216 is related to channel and distribution strategy and can include a product distributor. A product distributor may include off-line distribution of IoT related products, services and online distribution of solutions for a certain customer and/or a market. Delivery manager 216 may include various APIs that enable application developers to deliver information products. Delivery manager 216 can include data visualization, exploration tools, and/or any other method for rapidly delivering data related to building 10 to an end user. In some embodiments, delivery manager 216 is integrated with various enterprise applications e.g., applications owned and/or operated by GOOGLE®, MICROSOFT®, and/or any other entity.

Operation support 218 may facilitate the integration and optimization of devices, systems, and components to unite interrelated applications. Operation support 218 can include various financial and/or customer services. For example, operation support 218 may include various applications for customer relationship management (CRM), enterprise resource planning (ERP), customer billing, reporting information regarding building 10 and/or any other business related application. For example, operation support 218 can facilitate providing data from IoT platform 236 to outside businesses (e.g., insurance companies, utility providers, governmental agencies, etc.) that may have an interest in such data.

Figure 3:
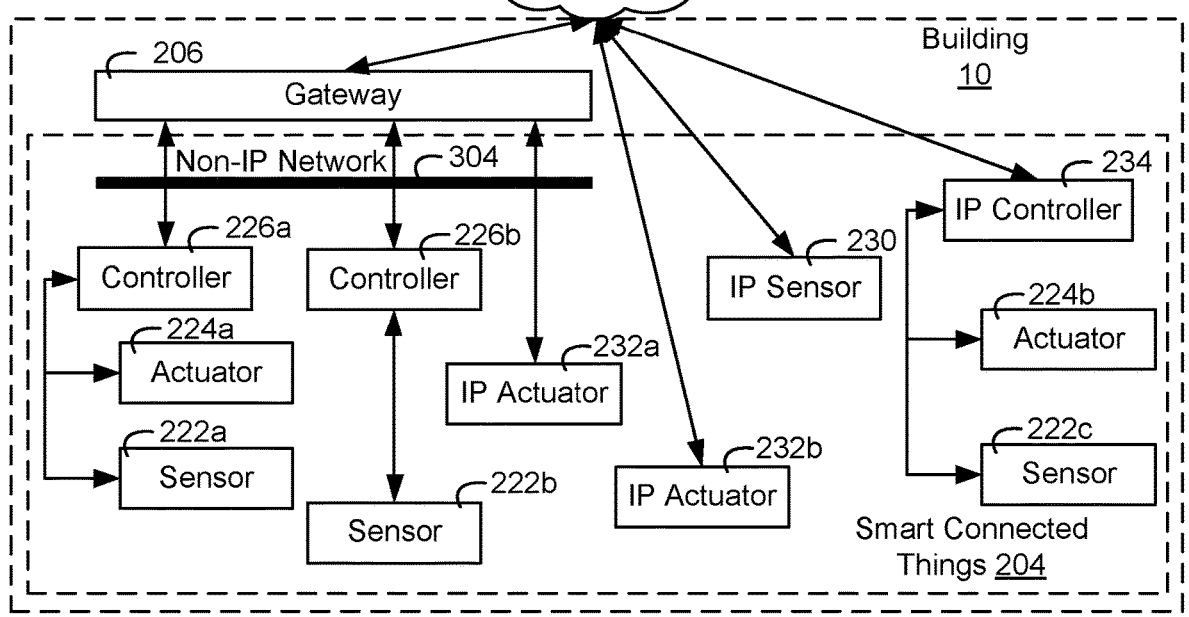
FIG. 3 is a system block diagram of the HVAC equipment in the building of FIGS. 1-2 in greater detail, according to some embodiments.

Referring now to FIG. 3, smart connected things 204 and building 10 as described with reference to FIGS. 1-2 is shown in greater detail, according to an exemplary embodiment. In FIG. 3, cloud platform 202 as described with further reference to FIG. 2 is shown to be connected to IP network 302. IP network 302 may be any IP network and/or communication protocol. For example, IP network 302 may be and/or include TCP/IP, Ethernet, Wi-Fi, Zigbee IP, a building WAN, etc. Gateway 206, as described with further reference to FIG. 2, is shown to communicate with both IP network 302 and non-IP network 304. Non-IP network 304 may include networks and/or protocols that are not IP based. For example, non-IP network 304 may be and/or include Zigbee, BACnet, controller area network (CAN) protocol, Modbus, and/or any other non-IP based network and/or protocol.

In FIG. 3, controller 226a and 226b are shown to communicate to cloud platform 202 via gateway 206. Controller 226a and 226b may be similar to and/or the same as controllers 226 as described with further reference to FIG. 2. Actuator 224a, sensor 222a, and sensor 222b may be connected to cloud platform 202 via controller 226a and controller 226b respectively. Actuator 224a, sensor 222a, and sensor 222b may be the same and/or similar to actuators 224 and/or sensors 222 as described with further reference to FIG. 2. IP actuator 232a can be connected to cloud platform 202 via gateway 206 even though IP actuator 232a may be able to communicate directly with IP network 302. IP actuator 232a may be the same and/or similar to IP actuator 232 as described with further reference to FIG. 2.

IP sensor 230, IP actuator 232b, and IP controller 234 are shown to communicate directly with cloud platform 202 via IP network 302. IP sensor 230 and IP controller 234 are described with further reference to FIG. 2 while IP actuator 232b may be the same and/or similar to IP actuator 232 as described with reference to FIG. 2. As shown, IP sensor 230, IP actuator 232b, and IP controller 234 communicate to cloud platform 202 without first communicating to gateway 206. IP controller 234 is shown to communicate with actuator 224b and sensor 222c both of which may not be configured to communicate with IP network 302. Actuator 224b and sensor 222c may be the same and/or similar to actuator 224 and sensor 222 as described with further reference to FIG. 2. IP controller 234 can effectively act as a gateway for actuator 224b and sensor 222c and connect both devices to cloud platform 202.

Even though some devices of building 10 must communicate to cloud platform 202 via gateway 206 while other devices can communicate directly with cloud platform 202, the data of all of the devices of building 10 can be "joined together" via cloud platform 202 and/or utilized by cloud platform 202 as an aggregate data set in some embodiments. The devices are "joined together" in the sense that cloud platform 202 can make decisions for all of the devices of building 10 based on all of the data retrieved from all of the devices of building 10. In this regard, building 10 can be understood to be a "self-conscious" building, a building in which decisions are made based on a complete set of data of all building devices.

Figure 4:
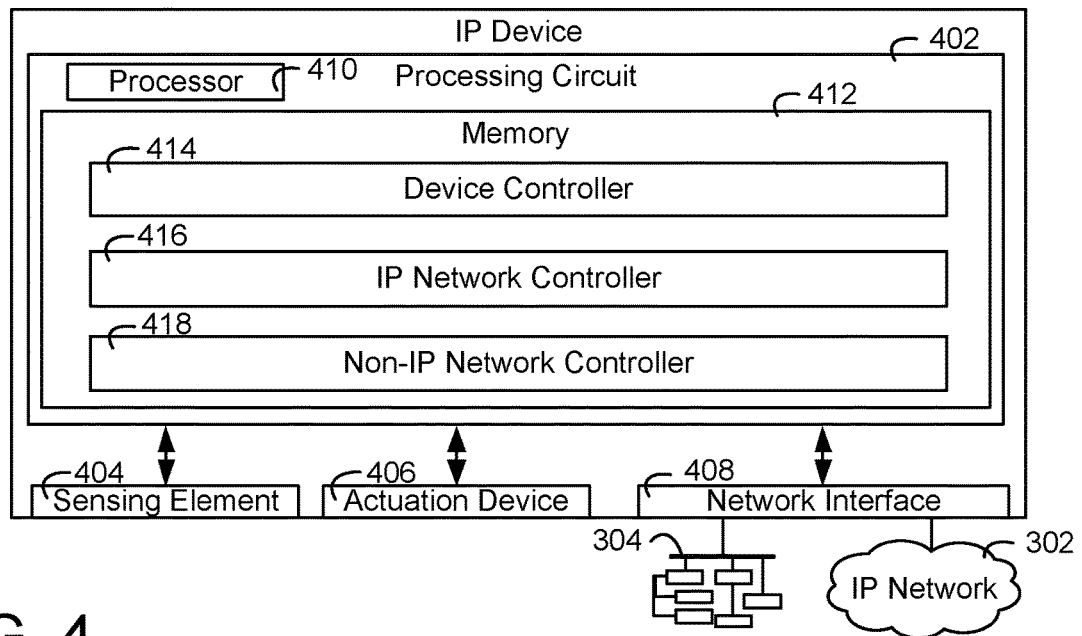
FIG. 4 is a block diagram of an internet enabled HVAC device of the building of FIGS. 1-3 in greater detail, according to some embodiments.

Referring now to FIG. 4, an IP device 400 is shown, according to an exemplary embodiment. IP device 400 may be any one of IP devices 228 as described with further reference to FIG. 2. IP device 400 is shown to include a network interface 408. Network interface 408 may be a hardware interface which allows IP device 400 to communicate with both non-IP network 304 and IP network 302. IP device 400 is shown to include sensing element 404 and actuation device 406. Sensing element 404 may be one or more hardware components configured to measure temperature, pressure, humidity, pressure, air quality, and/or any other environmental and/or non-environmental condition. Actuation device 406 may be any device that IP device 400 can control to affect an environmental change in building 10. For example, actuator device 406 may be an electric motor that IP device 400 can use to control a valve.

IP device 400 includes a processing circuit 402 that includes processor 410 and memory 412. In this regard, information stored on memory 412 can be executed on processor 410. Memory 412 is shown to include device controller 414. In some embodiments, device controller 414 can send data collected from sensing element 404 to cloud platform 202 via IP network 302. In various embodiments, device controller 414 receives control commands from cloud platform 202 for actuation device 406. In this regard, device controller 414 can be configured to control actuator device 406 based on the commands received from cloud platform 202.

Device controller 414 can be configured to send control commands to various devices connected to IP device 400, receive data from the various devices, receive data from sensing element 404, and/or send commands to actuation device 406. For example, if IP device 400 is IP controller 234 as described with references to FIG. 3, device controller 414 can be configured to control actuator 224b and/or sensor 222c. In this regard, device controller 414 may send data to cloud platform 202 that device controller 414 receives from actuator 224b and/or sensor 222c. Further, device controller 414 can be configured to send control commands to actuator 224b and/or 222c based on messages and/or data device controller 414 can receive from IP network 302.

IP network controller 416 can be configured to facilitate communicate with IP network 302. In some embodiments, IP network controller 416 includes instructions for various Internet communication protocols (e.g., Transmission Control Protocol/Internet Protocol (TCP/IP), Internet Protocol Version 4 (IPv4), Internet Protocol Version 6 (IPv6), etc.). Non-IP network controller 418 can be configured to facilitate communication with non-IP network 304 and/or any other non-IP based network or communication protocol for communicating with other devices in building 10.

Systems and Methods for Data Collection

Referring now to FIG. 5A, a block diagram of a building data collection system is shown, according to an exemplary embodiment. System 500 includes gateways 502a-d that are configured to transmit data collected via non-IP Network 508 from controllers 510a-d, actuators 512a-c, sensors 514a-b, and IP actuator 516 to building server 504 via IP network 506. Various components of system 500 are shown to exist in building 10 while other components are shown to exist remotely, outside of building 10. The gateways 502a-d, the non-IP network 508, the controllers 510a-d, the actuators 512a-b, the sensors 514a-c, and IP actuator 516 are shown to be located in building 10. Building server 504 and user device 540 are shown to be located outside of building 10 however, in various embodiments, building server 504 and/or user device 540 are located in building 10. User device 540 may be located anywhere, inside building 10 and/or outside building 10. In various embodiments, IP network 506 is simultaneously located inside building 10 (e.g., a wide area network (WAN)) and outside building 10 (e.g., the Internet).

Controllers 510a-d can be computer systems (e.g., one or more processors coupled to one or more memory devices) that can be configured to sample, collect, and/or extract data from various connected devices and/or generate commands for controlling the connected devices. In some embodiments, controllers 510a-d are computer systems running METASYS®, VERASYS®, and/or other building management software. In some embodiments, controllers 510a-d are at least one or a combination of a controller, a thermostat, a sensor, and/or an actuator that can process data and/or control another device. In some embodiments, controllers 510a-d are Network Automation Engines (NAEs), Network Integration Engines (NIEs), Advanced Field Equipment Controllers (FACs), a Field Equipment Controllers (FECs), Network Control Engines (NCEs) and/or any other network engine or equipment controller. In various embodiments, controllers 510a-d are laptop computers, desktop computers, servers, and/or any other computing device. Controllers 510a-c can be configured to control, communicate with, and receive data from actuators 512a-b, sensors 514a-b, and IP actuator 516. In this regard, the controllers 510a-d can be configured to control the actuators 512a-b, sensors 514a-b, and IP actuator 516 to affect an environmental change in building 10 and/or a zone of building 10.

Actuators 512a-b may be various HVAC devices of building 10. In some embodiments, actuators 512a-b are chiller 102, boiler 104, AHU 106, VAV unit 116 as described with reference to FIG. 1. In various embodiments, actuators 512a-b are thermostats, valves, light controllers, indoor units (e.g., a commercial or residential air handler or furnace, a commercial or residential air conditioner or heat pump, etc.). Actuators 512a-b can be any HVAC component or device. In this regard, actuators 512a-b can be configured to affect an environmental change in building 10. In some embodiments, the environmental change is controlling temperature, humidity, air quality, lighting, airflow in building 10 and/or a zone of building 10.

Sensors 514a-c can be any sensor and/or sensing element. For example, sensors 514a-c may be devices that include thermistors, thermocouples, humidity sensing elements, barometers, etc. In various embodiments, sensors 514a-c are sensing elements coupled to processing circuits which can communicate various readings to controllers 510a-d. In this regard, sensors 514a-d can be configured to measure data and send the data to controllers 510a-d.

IP actuator 516 may be the same as actuators 512a-b. However, IP actuator 516 may be an IP network enabled actuator. In this regard, IP actuator 516 may communicate to IP network 506 with or without the help of gateways 502a-d. In this regard, legacy equipment can be replaced with new IP enabled equipment (e.g., IP actuator 516). However, due to the presence of gateways 502a-d which can connect legacy equipment to building server 504, the legacy equipment does not need to be entirely replaced and can be replaced in portions (e.g., some of the devices instead of all of the devices).

Controllers 510a-d, actuators 512a-b, sensors 514a-c, and IP actuator 516 may form various controller-device topologies, controller-controller topologies, and combinations of controller-device topologies and controller-controller topologies. In this regard, gateways 502a-d can be configured to support both controller-device topologies, controller-controller topologies, and combinations of controller-device topologies and controller-controller topologies. Controller 510a is shown to communicate with actuator 512a and gateway 502a. This is an example of a controller-device topology. Gateway 502a may collect data from controller 510a and actuator 512b via controller 510a. The devices of gateway 502a, controller 510a and actuator 512b, are collectively referred to as "devices 11" as used herein.

An example of a combination of controller-controller topology and controller-device topology is controller 510c, sensor 514c, controller 510d, and sensor 514b. Controller 510c is shown to communicate with gateway 502c. However, controller 510d does not communicate directly with gateway 502c. Rather, gateway 502c communicates with controller 510c to receive the data of controller 510d. In this regard, controller 510c may map sensor 514c, controller 510d, and sensor 514b and the various data points of these devices and push any collected data of these devices to gateway 502c.

The controller-controller topology of controller 510c and controller 510d are an example of systems on systems communicating to a single gateway, gateway 502c. Controller 510d may be communicably coupled to gateway 502c via controller 510c. Various sensors or actuators may be communicably coupled to gateway 502c via controller 510c. Further, various sensors or actuators may be communicably coupled to gateway 502c via controller 510c and controller 510d. For example, sensor 514b is communicably coupled to gateway 502c via controller 510d and controller 510c.

Non-IP network 508 is shown to facilitate communication between and among controllers 510a-c and gateways 502a-d. Non-IP network 508 may be any network that is not IP based. Specifically, non-IP network 508 may be a building network that is not IP based. Examples of non-IP based networks that non-IP network 508 may be are Modbus, BACnet, LonWorks, N2, non-IP Zigbee, and any combination thereof. In some embodiments, non-IP network 508 includes a LAN network. In some embodiments, non-IP network 508 is an IP network (e.g., IP network 506) in addition to a non-IP network. Non-IP network 508 may be any network that does not have access to building server 504.

IP network 506 is shown to facilitate communication between gateways 502a-d and building server 504. IP network 506 may be any IP based network. IP network 506 may include one and/or a combination of wireless and/or wired communication networks. For example, IP network 506 may include Wi-Fi, Zigbee IP, a wide area network (WAN), an Ethernet network, a 3G network, a 4G LTE network, the Internet, etc.

In some embodiments, gateways 502a-d are all connected to one another via non-IP network 508. In this regard, the data received by gateway 502a may also be accessible by gateway 502d. This may allow gateway 502a to receive data from IP actuator 516 and push the data to building server 504 if gateway 502d is experiencing a fault. In some embodiments, each of controller 510a, controller 510b, controller 510c, and IP actuator 516 are connected to all and/or some of gateways 502a-d via non-IP network 508. In this regard, gateway 502b may be connected to both controller 510b and controller 510c but is only configured to manage controller 510b. Gateway 502c may be configured to manage controller 510c. If gateway 502c goes offline (e.g., not connected to building server 504), gateway 502b can receive data from controller 510c and send the data to building server 504. In this regard, gateway 502b can take over the management duties of gateway 502c.

User device 540 is shown to communicate with IP network 506. User device 540 may be any computing device and may have a user interface. User device 540 may be and/or include a smartphone, a tablet, a laptop computer, a desktop computer, a console and may include a touchscreen, a keyboard, a mouse, a display screen, etc. User device 540 can be configured to connect to configuration webpages hosted by gateways 502a-d and allow a user to make changes to gateways 502a-d via the configuration webpages. In various embodiments, user device 540 can connect and communicate with building server 504.

Building server 504 can be any server and/or computing device that can be located remote from building 10 and/or on the same premises as building 10. Building server 504 can include a processing circuit including one or more processors and one or more memory devices. The processing circuit and/or the one or more processors and/or the one or more memory devices can be configured to perform the various functions of building server 504. In some embodiments, building server 504 is cloud platform 202 and/or IoT platform 236 as described with reference to FIG. 2. Building server 504 is shown to include gateway manager 518, network interface 520, and server database 522. Network interface 520 may be any combination of hardware devices and software devices necessary for facilitating communication with IP network 506 and/or non-IP network 508. Network interface 520 may include various transmitters, receivers, and the like. Network interface 520 can be configured to allow gateway manager 518 to communicate with IP network 506 and thus user device 540, and gateways 502a-d.

Gateway manager 518 can be configured to communicate with and control gateways 502a-d. Gateway manager 518 can be configured to push data to gateways 502a-d and receive data from gateways 502a-d. Gateway manager 518 is shown to include fault manager 526, representation manager 528, and application manager 530.

Server database 522 may be any kind of database and/or storage medium. Server database 522 may be a non-relational database (NoSQL), a relational database (RDB), a key-value database, and/or any other type or combination of database types or storage devices. Server database 522 may be and/or include various data storage devices (e.g., RAM, ROM, HDDS, SSDS, etc.). Server database 522 is shown to store logical network representation 532 and gateway software data 534. Gateway software data 534 may be a repository of all software that gateways 502a-d may run. This software may be firmware, network drivers (e.g., for a specific protocol), device drivers (e.g., drivers for controllers 510a-d, actuators 512a-b, etc.), etc.

Logical network representation 532 may be a representation of the devices of building 10. In this regard, logical network representation 532 may indicate the connections between various devices of building 10 (e.g., gateways 502a-d, controllers 510a-d, actuators 512a-c, sensors 514a-c). Further, logical network representation 532 may indicate the data points of each device. As used herein, "points" or "data points" refer to sensor inputs, control outputs, control values, and/or different characteristics of the inputs and/or outputs. "Points" and/or "data points" may refer to various data objects relating to the inputs and the outputs such as BACnet objects. The objects may represent and/or include a point and/or group of points. The object may include various properties for each of the points. For example, an analog input may be a particular point represented by an object with one or more properties describing the analog input and another property describing the sampling rate of the analog input. An example of an object identifying a particular point is shown in greater detail in FIG. 14B. Logical network representation 532 may include gateway configuration and point lists for gateways of building 10. The point list may include data points that building server 504 creates control values for and pushes to the gateway to be sent to a particular device.

Logical network representation 532 may be a repository of the current configuration of each gateway of building 10. Gateway configuration may indicate the current operating status of one or more gateways, the software (e.g., drivers) installed on each gateway, and/or other information pertaining to the configuration of the gateways. The point lists for each gateway of building 10 that may be stored by logical network representation 532 may be a list of points that each of the gateways collects data from and sends the collected data to building server 504. In various embodiments, the point lists indicate which points building server 504 sends commands to.

Fault manager 526 can be configured to monitor gateways 502a-d for faults. In some embodiments, fault manager 526 can be configured to receive a "heart-bit" from each of gateways 502a-d. A heart-bit may be a message which indicates that the gateway sending the heart-bit is currently online (e.g., functioning properly). In this regard, the heart-bit may include a gateway identifier that identifies the gateway sending the heart-bit and a particular indicator (e.g., bit and/or bits) which indicate the current status of the gateway (e.g., online, experiencing minor faults, experiencing major faults, etc.). Fault manager 526 may include various timing devices (e.g., software timers, hardware timers, etc.) that fault manager 526 can be configured to use to determine if a predefined amount of time has passed since receiving a heart-bit from a particular gateway 502a-d. Fault manager 526 may monitor each of gateways 502a-d to determine if one or more of the gateways 502a-d are experiencing a fault, i.e., are unresponsive and have stopped sending their respective heart-bit message.

In some embodiments, fault manager 526 can be configured to send a heart-bit request message to a gateway (e.g., gateways 502a-d) that has been unresponsive for a predefined amount of time. The heart-bit request message may be a message (e.g., a ping) which causes the unresponsive gateway to send a heart-bit message to building server 504. In response to receiving the heart-bit after sending the heart-bit request, fault manager 526 can be configured to allow the gateway to continue functioning. However, if fault manager 526 does not receive the heart-bit after sending the heart-bit request to the gateway (e.g., a predefined amount of time after sending the heart-bit request), fault manager 526 can be configured to select a second gateway to take over the operations of the unresponsive gateway.

Fault manager 526 can be configured to retrieve and/or query server database 522 for logical network representation 532 and/or information regarding logical network representation 532 stored in server database 522. Based on logical network representation 532, representation manager 528 can be configured to determine the status of each gateway in building 10. Fault manager 526 can be configured to grade each gateway 502a-d based on two performance metrics, processing availability and network availability. Fault manager 526 can be configured to generate the grade for each gateway based on the number of devices which the gateway 502a-d is currently responsible for servicing (e.g., collecting data and sending data to building server 504) and/or an amount of available processing resources of a gateway (i.e., a processing metric) and based on the amount of data that the gateway is currently sending to building server 504 (e.g., data rate) (i.e., network metric). In some embodiments, the grade is a combination of the network metric and the processing metric. In various embodiments, the grade is one of the network metric or the processing metric.

Fault manager 526 may be configured to select an extreme grade (e.g., lowest grade or highest grade) which indicates which gateway has the highest availability (e.g., the most appropriate gateway) to take over the responsibilities of the unresponsive gateway. Fault manager 526 can be configured to send gateway configuration to the new gateway which fault manager 526 has determined should take over the responsibilities of the gateway experiencing the fault. In some embodiments, the configuration data indicates the devices connected to the old gateway and any new software that the new gateway may not have gateway software data 534. In this regard, fault manager 526 can be configured to determine data that the new gateway will need. For example, fault manager 526 may receive and/or query server data base 522 for logical network representation 532. Fault manager 526 may compare a digital twin for the unresponsive gateway to the new gateway and determine if there is any software function (e.g., drivers) that the new gateway does not currently have. Digital twins are described with further references to FIGS. 5A-5E. In this regard, the gateway configuration data that fault manger 526 can be configured to send the gateway may include portions of and/or all of gateway software data 534. Fault manager 526 can be configured to retrieve and/or query server database 522 for point list 540. Point list 540 may indicate the current configuration of the devices connected to the unresponsive gateway and the configuration of each device.

Representation manager 528 can be configured to maintain logical network representation 532. Representation manager 528 may receive point lists from gateways 502*a-d* for the devices of building 10. Representation manager 528 can be configured to update logical network representation 532 based on the point lists received from gateways 502*a-d*. Further, representation manager 528 can be configured to send changes to the point list to gateways 502*a-d* whenever the configuration data stored in logical network representation 532 changes. For example, a user may indicate to building server 504, via user device 540, that sensor 514*a* should sample a temperature every minute as opposed to current sampling configuration of sensor 514*a*, sampling temperature every hour. Building server 504 may update the logical network representation 532 and pass the updated point list to the appropriate gateway, gateway 502*b*. In some embodiments, a user can make changes to a gateway of logical network representation 532 when the physical gateway is offline. In this embodiment, representation manager 528 may be configured to wait until the physical gateway comes online before passing the changes to the physical gateway.

Application manager 530 can be configured to communicate with user device 540 via IP network 506. Application manager 530 may be a web based interface that user device 540 can access. Application manager 530 can be configured to allow a user, via user device 540 to view the current network configuration (e.g., logical network representation 532). Application manager 530 may further allow a user to make changes to logical network representation 532 e.g., changing the sampling rate of a sensor, adding or removing a gateway, and/or other changes.

In various embodiments, application manager 530 is a piece of building software. Application manager 530 may generate control signals for building equipment (e.g., controllers, sensors and/or actuators of building 10), based on data collected from gateways 502*a-d*. In some embodiments, the control signals are received by gateways 502*a-d* and are sent to the building equipment. The control signals may cause the building equipment to affect an environmental change in building 10.

Application manager 530 can be configured to receive collected data from the devices of building 10 and store the collected data in telemetry data 542 of server database 522. Application manager 530 may receive a first interval and a second interval from the gateways 502*a-d* for a particular data point that one of gateways 502*a-d* is collecting data for. The first interval may be the interval at which the particular gateway collects (e.g., extracts) data for the data point. The second interval may be the interval at which the particular gateway sends the data for the data point to building server 504. The particular gateway may send the data whenever the second interval occurs and/or whenever the data changes value (e.g., changes by a predefined amount) from a previously collected data point. If application manager 530 does not receive a data point, application manager 530 can be configured to determine that the value of the data point has not changed and that application manager 530 can update telemetry data 542 to indicate that the value has not changed. For example, if application manger 530 receives 30 degrees Celsius and then does not receive a data reading for another two intervals of the first interval, application manager 530 can be configured to determine that the data readings for the two intervals are 30 degrees Celsius.

Figure 5B:
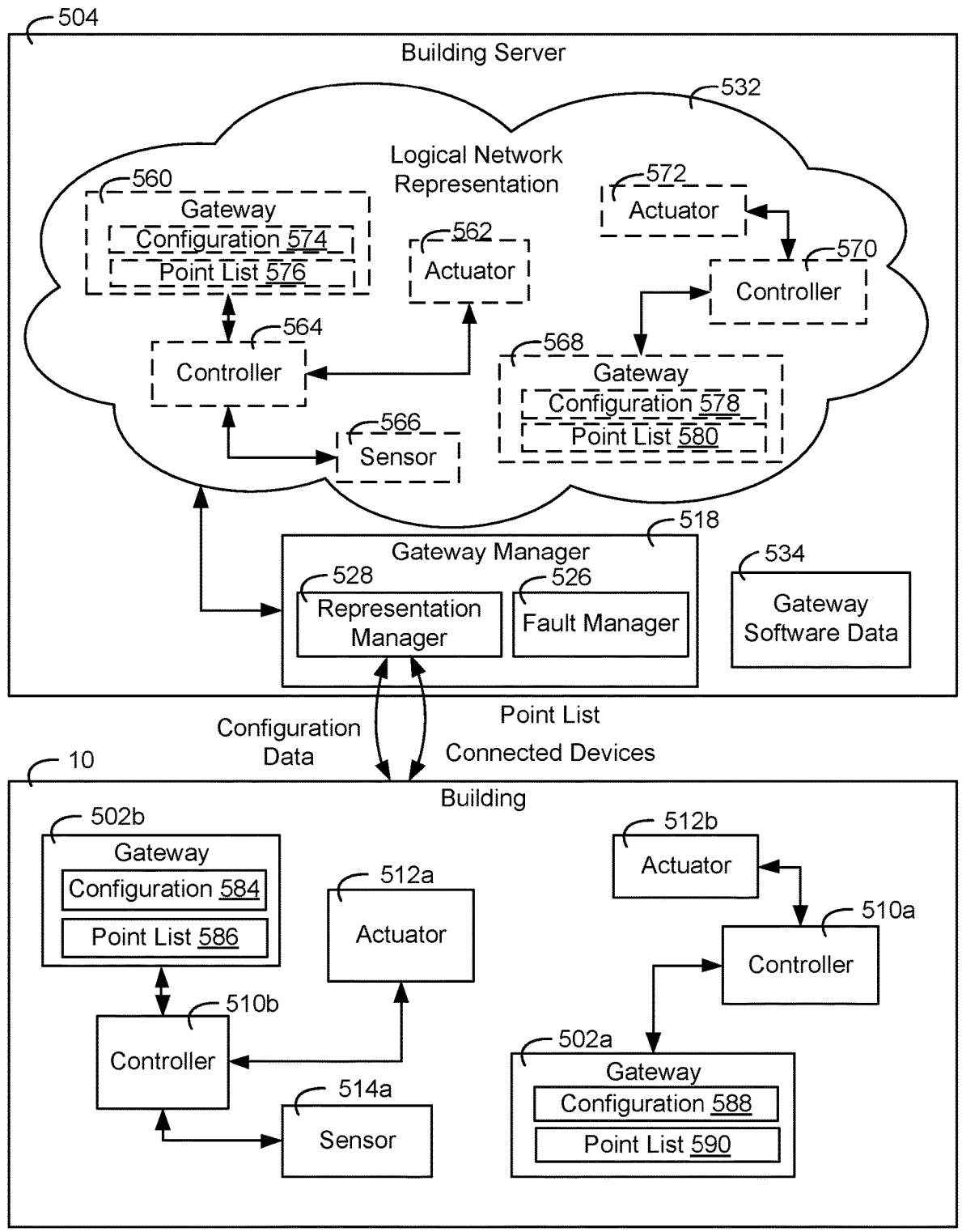
FIG. 5B is a diagram of a logical representation of the gateways, controllers and actuators of FIG. 5A, according to some embodiments.
Figure 5C:
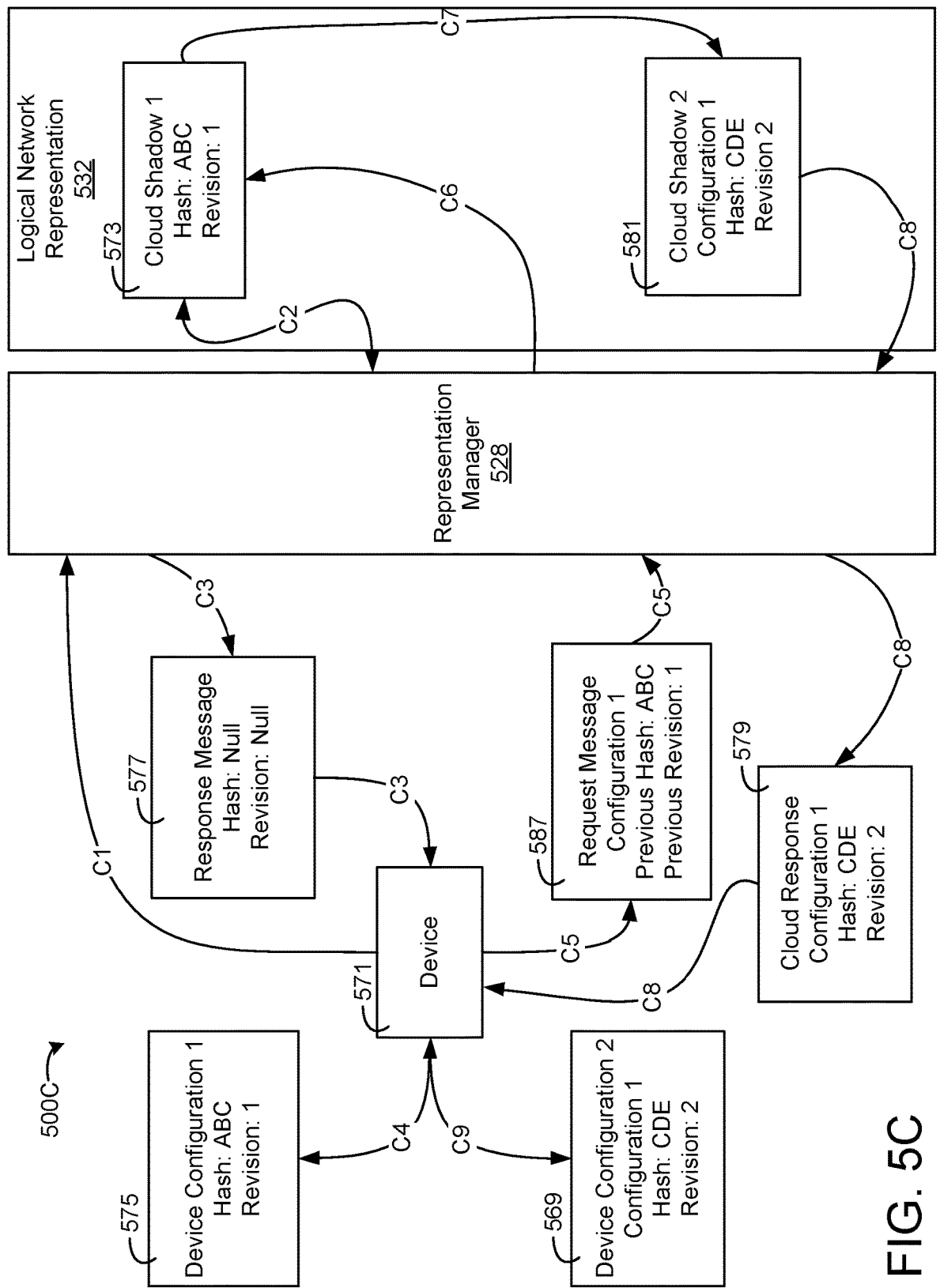
FIG. 5C is a flow diagram illustrating a process for managing the logical representation of FIG. 5B based on a request of a device, according to some embodiments.
Figure 5D:
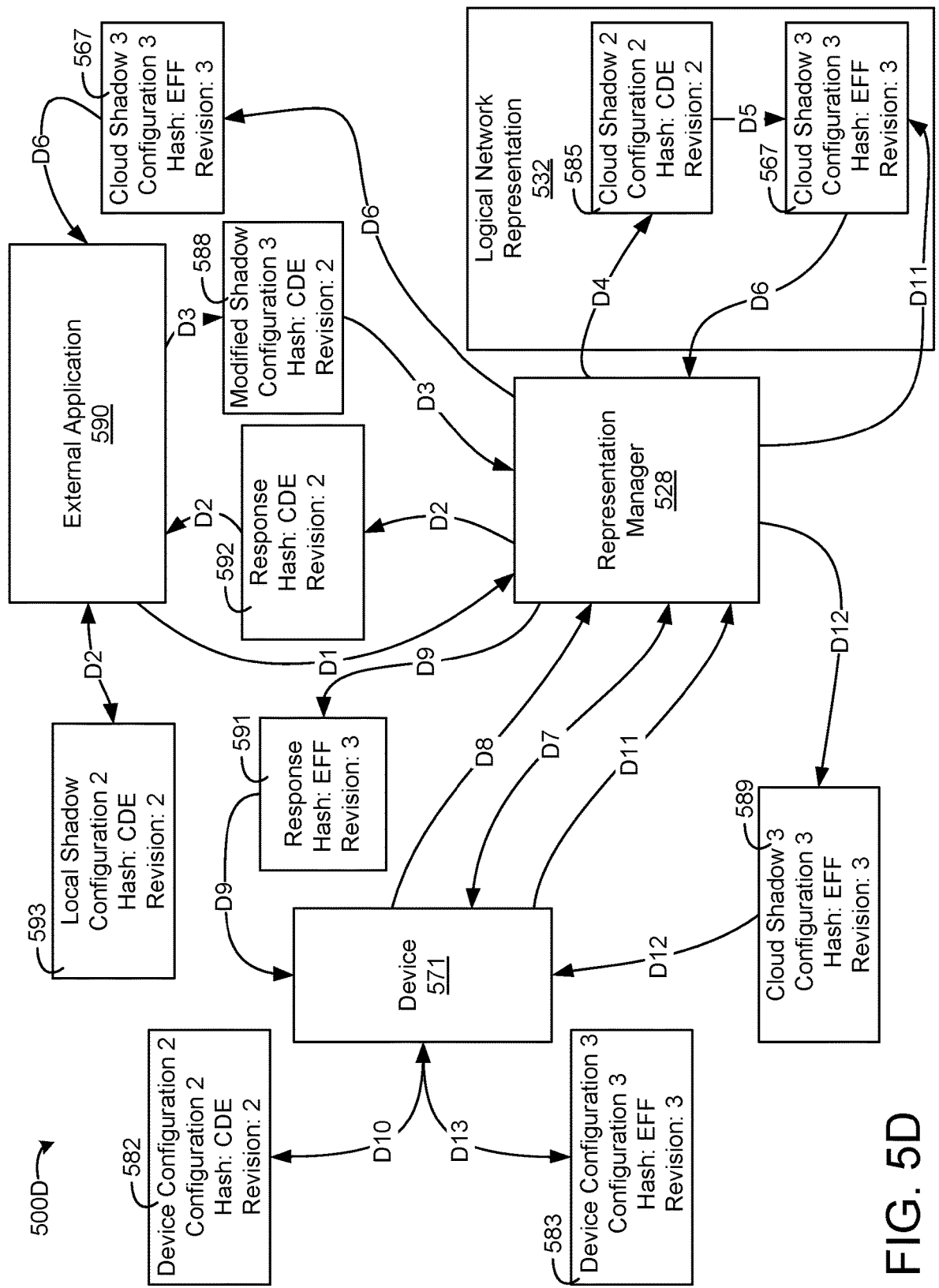
FIG. 5D is a flow diagram illustrating a process for managing the logical representation of FIG. 5B based on an update request of an external application, according to some embodiments.

Referring now to FIG. 5B, logical network representation 532 is shown in greater detail, according to an exemplary embodiment. FIG. 5B shows "digital twins" or "shadows" for various devices of building 10. The "digital twins" may be data stored in logical network representation 532 which tracks various information regarding the physical equipment in building 10. In some embodiments, "digital twins" are the same as the cloud shadows described with reference to FIGS. 5D-5C. In this regard, FIGS. 5D-5C illustrate the steps necessary for updating the cloud shadows on logical network representation 532 in addition to on various devices.

Building server 504 may track the current configuration of physical equipment in building 10. As shown, gateway 502*b* of building 10 has a digital twin, gateway 560 stored in logical network representation 532. Gateway 502*a* of building 10 has a digital twin, gateway 568 stored in logical network representation 532, controller 510*b* of building 10 has a digital twin controller 564 stored in logical network representation 532, actuator 512*a* of building 10 has a digital twin actuator 562 stored in logical network representation 532, sensor 514*a* of building 10 has a digital twin sensor 566 stored in logical network representation 532, actuator 512*b* of building 10 has a digital twin actuator 572 stored in logical network representation 532, and controller 510*a* of building 10 has a digital twin controller 570 stored in logical network representation 532.

The gateways of building 10, gateway 502*b* and 502*a*, may push connection information (e.g., what sensors, actuators, or controllers) they are communicable coupled with the building server 504. The connection information may be data source information which gateway 502*b* and 502*a* can send to building server 504. The data source information may identify each device (e.g., actuator or sensor) that is connected to gateways 502*b* and 502*a*. Representation manager 528 may update logical network representation 532 based on the information received. Further, any changes made in logical network representation 532 may be sent by representation manger 528 to an appropriate gateway. For example, if a user makes a change to logical network representation 532 indicating that gateway 502a should collect data for controller 510b (e.g., make changes to gateway 568 and controller 564), representation manager 528 may send a command to gateways 502a and gateway 502b indicating that gateway 502a should collect data for controller 510b instead of gateway 502b.

Logical network representation 532 is shown to store configuration data (e.g., configuration 574 and configuration 578) and point lists (e.g., point list 576 and point list 580). Configuration 574 and point list 576 may be representations of configuration data of gateway 502b and a point list stored on gateway 502b. Similarly, configuration 578 may be a representation of the configuration data stored on gateway 502a and the point list stored on gateway 502a.

Representation manager 528 can be configured to update configuration data in logical network representation 532 in addition to sending commands to gateways of building 10 to update configuration data. Further, various point lists which may be generated by the gateways of building 10 may be sent to building server 504. These point lists may be the same point list stored on the gateways of building 10 or may be a shorted point list containing a portion of the information stored in point list and excluding any information which is not necessary for logical network representation 532.

In some embodiments, gateway manager 518 can be configured to use logical network representation 532 to push point lists for a first gateway to a second gateway. For example, fault manager 526 can be configured to determine that gateway 502a is currently offline and is not communicating with building server 504. In response to determining that gateway manager 518 is offline, gateway manager 518 can select another gateway to take over for gateway 502a. In some embodiments, fault manager 526 makes the selection from available gateways based on the processing metric and the network metric as described with reference to FIG. 5A. In this example, gateway manager 518 selects gateway 502b as the replacement for gateway 502a.

Fault manager 526 can send point list 580 for gateway 502a to gateway 502b. In this regard, gateway 502b can take over control for controller 510a and actuator 512b. Further, fault manger 518 may compare configuration 578 to configuration 574 to determine if gateway 502b needs any particular updates to take over for gateway 502a. For example, gateway manager 518 may determine that gateway 502a uses a particular driver for communicating with controller 510a while gateway 502b does not have the necessary driver for communicating with controller 510a. In this regard, fault manager 526 may send the necessary driver to gateway 502b (e.g., a driver stored in gateway software data 534). Gateway 502b can be configured to install the necessary driver and then act as a data collector for controller 510a.

Point list 576 and/or point list 580 may be individual point lists for individual digital twins (e.g., gateway 560 and/or gateway 568). In other embodiments, point list 576 and point list 580 are a single point list which maps all points to various gateways. The single point list, may be a "master point list" which keeps track of changes to the assignment of points to gateways for use when the points of a first gateway need to be transferred to a second gateway if the first gateway is offline. For example, entries into the master point list and/or point list 576 and/or point list 580 may be the following:

<Point Identifier 1, gateway[x], gateway[x]>
<Point Identifier 2, gateway[y], gateway[z]>

The first entry into the master point list may identify that a particular gateway, gateway[x], was originally assigned to manage the point identified by Point Identifier 1 and that gateway[x] is currently managing the identified point. The second entry indicates that a point identified by Point Identifier 2 was originally managed by gateway[y] and is now being managed by gateway[z]. This may indicate that gateway[y] is offline and that gateway[z] is currently managing the point while gateway[y] is offline. If the connection for gateway[y] is restored, the entry can be consulted so that gateway[y] can resume managing the point identified by Point Identifier 2 and gateway[z] can stop managing the identified point.

Logical network representation 532 may maintain an indication of the network status of each gateway of building 10. The indication may be part of configuration 574 and/or configuration 578. For example, based on the heart-bit messages received from the gateways, representation manager 528 can be configured to update and/or change a list indicating the network status of each of the gateways of building 10. For example, the first entry below may indicate that gateway[x] is online building server 504 has received a heart-bit message from gateway[x]. However, the second entry below may indicate that gateway[y] has not sent a heart-bit message to building server 504.

<gateway[x]="green">
<gateway[y]="yellow">

Referring now to FIG. 5C, a flow diagram of a process 500C for managing logical representation 532 based on an update request of a device, according to an exemplary embodiment. Building server 504, gateways 502a-d, controllers 510a-d, actuators 512a-b, sensors 514a-c, IP actuator 516, and/or smart connected devices 204 can be configured to perform all and/or some of process 500C. Process 500C can be used by gateways 502a-d and building server 504 to transmit gateway configurations and point lists for one gateway to another gateway. Further, process 500C can be used by gateways 502a-d and building server 504 to maintain updates of the point list and/or configuration of one of gateways 502a-d in logical network representation 532.

In FIG. 5C, device 571 is shown. Device 571 can be one of gateways 502a-d, controllers 510a-d, actuators 512a-b, sensors 514a-c, and/or IP actuator 516 as described with further reference to FIG. 5A in addition to smart connected things 204 as described with reference to FIG. 2. Device configuration 1 575 and device configuration 2 569 can be configuration data stored on device 571. Device configuration 1 575 and device configuration 2 569 may be various versions of device configuration, for example, device configuration 1 575 may be the first configuration stored on device 571 while device configuration 2 569 may be a second configuration replacing the first configuration. In a similar manner, cloud shadow 1 573 and cloud shadow 2 581 may represent a single cloud shadow. Cloud shadow 1 573 may be a first version of the cloud shadow while cloud shadow 2 581 may replace cloud shadow 1 573. As referred to herein, "cloud shadows" may be "digital twins" or digital representations of the configurations of various HVAC devices stored in logical network representation 532.

Referring generally to FIGS. 5C-5D, FIGS. 5C-5D refer to "Configuration 1", "Configuration 2", and "Configuration 3." These configurations may be a point list (e.g., point list 627) and/or gateway configuration data (e.g., gateway configuration 629). Further, these configurations may be configurations for device 571 and may include objects and bounds. The objects may represent one or more points, while the bounds may represent one or more actions for the bounds. For example, a particular object may be an object of a particular sensor point. The bounds may represent a polling rate for a particular data point. In some embodiments, the bounds may be a list indicating which objects need to be polled and at what frequency each of the objects needs to be polled at. In some embodiments, the objects represent various information regarding a device. In the case of a gateway, the objects may indicate the drivers installed on each gateway.

In some embodiments, when device 571 is a gateway, device configuration 1 575, device configuration 2 569, cloud shadow 1 573, and/or cloud shadow 2 581 includes a point list, gateway configuration data, and/or an indication of the devices connected to device 571 (e.g., gateway data 626, gateway configuration 629, point list 627 and/or connected devices 631). This may be represented in FIG. 5C by "Configuration 1," which may store device configuration information and/or a point list. Cloud shadow 1 573 and cloud shadow 2 581 may be a logical twin of device 571. The logical twin may be a digital representation of device 571. Logical twins are described with further reference to FIG. 5B.

At C1, device 571 sends a request to representation manager 528 for a hash value and a shadow configuration number to identify the current version of a shadow for device 571. At C2, based on the request message of C1, representation manager 528 retrieves the hash value and the revision number of the current shadow, cloud shadow 1 573. In some embodiments, representation manger 518 hashes (e.g., MD5 hashing) all of the properties and/or information stored in cloud shadow 1 573 to generate the hash value. The revision number may be retrieved from the current cloud shadow, cloud shadow 1 573.

At C3, response message 577 is sent by representation manager 528 to device 571. Response message 577 is shown to include a hash value and a revision number. In FIG. 5C, the hash value is a "null" and the revision number is "null". This indicates that device 571 has never synchronized with representation manager 528. At C4, device 571 can compare the hash and revision number of response message 577 to device configuration 1 575. Since the hash of response message 577 does not match the hash and the revision number of device configuration 1 575 does not match the revision of response message 577, device 571 determines that cloud shadow 1 573 does not match device configuration 1 and/or that device 571 has not been synchronized with representation manager 528. In some embodiments, device 571 generates an alert message that can be viewed on device 571, building server 504, and/or user device 540 identifying that logical network representation 532 is not correct and/or the configuration of device 571 is not correct. In some embodiments, device 571 continues to C5 in response to determining that response message 577 does not match device configuration 1 575.

At C5, device 571 sends a request message 587 for representation manager 528 to update cloud shadow 1 573. C5 may be performed in response to determining that response message 577 does not match device configuration 1 575. In some embodiments, device 571 performs C5 in response to adding new information to device configuration 1 575. For instance, device 571 may be connected to a new sensor which includes a new data point to sample. This information may be added to device configuration 1 575 (e.g., configuration 1 of request message 587) and device 571 can send the updated device configuration 1 575 with the hash value and the revision number of device configuration 1 575 to representation manager 528. At C5, device 571 sends a request message to representation manager 528 to update logical network representation 532 with new configuration information and/or to send the current shadow to device 571. In some embodiments, request message 587 indicates the configuration data, configuration 1, that device 571 is aware of. Request message 587 is shown to include Configuration 1, in addition to the hash value and revision value of device configuration 1 575.

At C6, representation manager 528 can determine if the revision stored in cloud shadow 1 573 matches the revision number of request message 587. In response to determining that the revision numbers match, representation manager can perform C7. At C7, representation manager increments the revision number, (e.g., from 1 to 2) and computes a new hash value. Further, representation manager 528 can add Configuration 1 to the current shadow and/or update a current configuration with Configuration 1. Cloud shadow 2 581 may replace cloud shadow 1 573. Further, at C7, representation manager 528 can compute a new hash value (e.g., CDE). The hash value may be hashed based on configuration 1 received from request message 587 and/or cloud shadow 2 581. Representation manager 528 may hash various attributes of configuration 1 and/or cloud shadow 2 581 to generate the new hash value.

At C8, representation manager sends cloud response 579 to device 571 with the hash and revision number of cloud shadow 2 581. Cloud response is shown to include the hash CDE and revision number 2 in addition to configuration 1 received from request message 587. At C9, based on cloud response 579, device 571 can be configured to update the device configuration of device 571 with cloud response 579. The result of the update may be device configuration 2 569.

Referring now to FIG. 5D, a flow diagram of a process 500D for managing logical representation 532 based on an update request from an external application, according to an exemplary embodiment. Building server 504, gateways 502a-d, controllers 510a-d, actuators 512a-b, sensors 514a-c, and/or IP actuator 516 can be configured to perform all and/or some of process 500D. Process 500D can be used by gateways 502a-d and building server 504 to transmit gateway configurations and point lists for one gateway to another gateway. Further, process 500D can be used by gateways 502a-d and building server 504 to maintain updates of the point list and/or configuration of one of gateways 502a-d in logical network representation 532.

External application 590 may be any application which allows a user to make changes to device 571. In some embodiments, external application 590 may be a software application installed on user device 540. In this regard, user device 540 can be configured to perform some and/or all of process 500D. Device configuration 2 582 and device configuration 3 583 can be configuration data stored on device 571. Device configuration 2 582 and device configuration 3 583 may be various versions of device configuration, for example, device configuration 2 582 may be the first configuration stored on device 571 while device configuration 3 583 may be a second configuration replacing the first configuration. In a similar manner, cloud shadow 2 585 and cloud shadow 3 567 may represent a single cloud shadow at two points in time. Cloud shadow 2 585 may be a first version of the cloud shadow while cloud shadow 3 567 may replace cloud shadow 2 585.

In some embodiments, when device 571 is a gateway, device configuration 2 582, device configuration 3 583, cloud shadow 2 585, and/or cloud shadow 3 567 includes a point list, gateway configuration data, and/or an indication of the devices connected to device 571 (e.g., gateway data 626, gateway configuration 629, point list 627 and/or connected devices 631). This may be represented in FIG. 5C by "Configuration 2" and "Configuration 3" which may store device configuration information and/or a point list. Cloud shadow 2 585 and cloud shadow 3 567 may be a logical twin of device 571. The logical twin may be a digital representation of device 571. Logical twins are described with further reference to FIG. 5B.

At D1, external application 590 retrieves and/or sends a request message for data from logical network representation 532 for device 571. The request may be a request for the current version number and/or hash value of the shadow for a particular device (e.g., device 571). In some embodiments, the information retrieved is cloud shadow 2 585. At D2, representation manager 528 sends a hash value (e.g., "CDE") and a revision number (e.g., revision 2) of the shadow stored in logical network representation 532 (e.g., cloud shadow 2 585). External application 590 can determine that the revision number and/or hash value received in response 592 matches a local shadow 593 stored on external application 590. In some embodiments, external application 590 may present cloud shadow 2 585 to a user to be viewed and/or edited, for example, viewed shadow 584. In this example, the hash value and the revision number of local shadow 593 match the hash value and the revision number of response 592. In the event that there is not a match, external application 590 may request a current shadow from representation manger 528 to synchronize local shadow 593 with the current cloud shadow for device 571 stored in logical network representation 532.

At D3, based on one or more changes made to local shadow 593, external application 590 sends a modified shadow 588 to representation manager 528. Modified shadow 588 is shown to have a new configuration, configuration 3. Configuration 3 may be an edited version of configuration 2. Configuration 3 may include various new points for device 571 to poll, e.g., poll a new sensor data point. Further, configuration 3 may be a point list with deleted points. For example, configuration 2 may include 4 points while configuration 3 may include 2 of the 4 points of configuration 2. In some embodiments, configuration 3 includes an indication to sample a particular point already identified in local shadow 593 at a particular frequency.

At D4, representation manager 528 determines if the revision of cloud shadow 2 585 matches the revision of modified shadow 588. In this example, both have the revision 2. In response to determining that the revision numbers match, representation manager 528 can perform D5. At D5, representation manger 518 can increment the revision number of the cloud shadow (e.g., increment the revision number to 3), update the configuration (e.g., update the configuration to configuration 3), and compute a new hash value based on the updated configuration and/or based on cloud shadow 3 567. The result may be cloud shadow 3 567 which replaces cloud shadow 2 585.

At D6, representation manager 528 can send cloud shadow 3 567 to external application 590. External application 590 can view cloud shadow 3 567 to verify that cloud shadow 3 567 matches modified shadow 588. In various embodiments, a user may view cloud shadow 3 567 via external application 590 and/or user device 540.

At D7, representation manager 528 sends a check in command to device 571. In some embodiments, the command is sent via a gateway and/or internet of things (IoT) hub. Device 571 may reply to the check-in command indicating the device 571 is connected to representation manger 518. In some embodiments, the check-in command indicates that logical network representation 532 has been updated and/or that device 571 needs to check for an update to logical network representation 532. In some embodiments, in response to receiving the check-in command, device 571 performs D8.

At D8, device 571 sends a request for the current cloud shadow stored in logical network representation 532 for device 571 and/or for the revision number of the current cloud shadow. In some embodiments, device 571 performs D8 periodically. In some embodiments, device 571 performs D8 in response to receiving a check-in command at D7. At D9, representation manager 528 can send a response 591 to device 571. Response 591 may include the current hash value and revision number of the cloud shadow. In this example, response 591 includes hash value "EFF" and revision number 3.

At D10, device 571 can determine that the configuration on device 571 is out of date based on the revision number and/or hash value of response 591 and device configuration 2 582 and can send a request to representation manger 518 for the most recent cloud shadow (D11). Representation manger 518 can retrieve the cloud shadow, cloud shadow 586. At D12, representation manager 528 sends the cloud shadow, cloud shadow 3 567 to device 571. Based on cloud shadow 3 567 received at D12, device 571 can update the configuration of device 571. At D13, device 571 updates the configuration of device 571 based on cloud shadow 3 567 received at D12. Device 571 can replace and/or update device configuration 582 with device configuration 3 583. Device configuration 3 includes Configuration 3 of cloud shadow 3 567, the hash value associated with cloud shadow 3 567, "EFF", and the revision number, 3. In some embodiments, device 571 operates based on configuration 3. For example, configuration 3, as indicated by external application 590, includes a command to sample a particular sensor once every minute. This command may not have existed in configuration 2. In response to updating the configuration of device 571 from configuration 2 to configuration 3, device 571 may sample the particular sensor once every minute.

Figure 5E:
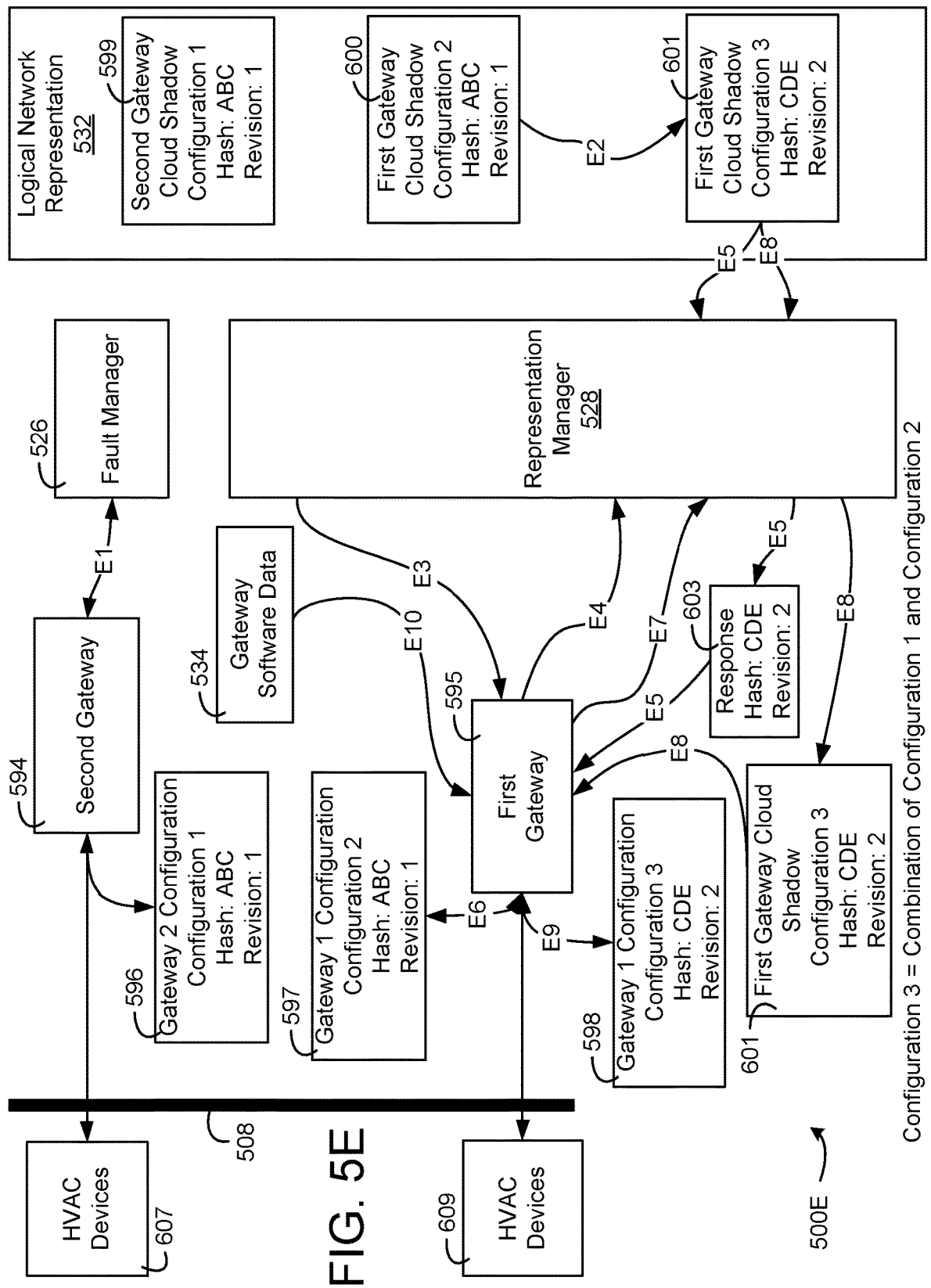
FIG. 5E is a flow diagram for updating a first gateway when a second gateway is offline based on the logical representation of FIG. 5B, according to some embodiments.

Referring now to FIG. 5E, a process 500E for updating a first gateway when a second gateway is offline based on logical representation 532 is shown, according to an exemplary embodiment. Building server 504, gateways 502a-d, controllers 510a-d, actuators 512a-b, sensors 514a-c, and/or IP actuator 516 can be configured to perform all and/or some of process 500D.

In some embodiments, gateway 2 configuration 596, gateway 1 configuration 597, gateway 1 configuration 598, second gateway cloud shadow 599, first gateway cloud shadow 600, and/or first gateway cloud shadow 601 includes a point list, gateway configuration data, and/or an indication of the devices (e.g., HVAC devices 607 and HVAC devices 609) connected to second gateway 594 and/or first gateway 595. This data may be represented in FIG. 5E by "Configuration 1," "Configuration 2," and "Configuration 3" which may store device configuration information and/or a point list. Second gateway cloud shadow 599 may be a logical twin of second gateway 594 while first gateway cloud shadow 600 and first gateway cloud shadow 601 may be digital twins of first gateway 595. The logical twins may be digital representations of second gateway 594 and first gateway 595. Logical twins are described with further reference to FIG. 5B.

In FIG. 5E, second gateway 594 is shown to be connected to HVAC devices 607 via non-IP network 508 while first gateway 595 is shown to be connected to HVAC devices 609 via non-IP network 508. Second gateway 594 may be gateway 502b while HVAC devices 607 may be and/or include controller 510b, actuator 512a, and sensor 514a. First gateway 595 may be gateway 502a and HVAC devices 609 may be and/or include controller 510a and actuator 512b.

Gateway 1 configuration 597 and gateway configuration 1 598 can be configuration data stored by first gateway 595. Gateway 1 configuration 597 and gateway configuration 1 598 may be various versions of device configuration of first gateway 595, for example, gateway 1 configuration 597 may be a first configuration stored on first gateway 595 while gateway 1 configuration 598 may be a second configuration replacing the first configuration. In a similar manner, first gateway cloud shadow 600 and first gateway cloud shadow 601 may represent a single cloud shadow for first gateway 595 at two points in time. First gateway cloud shadow 601 may replace first gateway cloud shadow 600. Gateway 2 configuration 596 may be a configuration for second gateway 594 while second gateway cloud shadow 599 may be a cloud shadow for second gateway 594.

Gateway 2 configuration 596 may be any necessary configuration for second gateway 594 to communicate with HVAC devices 607 and/or collect (e.g., extract) point data from HVAC devices 607. Similarly, gateway 1 configuration 597 may be a configuration for first gateway 595 to collect data from HVAC devices 609. Gateway 1 configuration 598, an update to gateway 1 configuration 597, may allow first gateway 595 to communicate with both HVAC devices 607 and HVAC devices 609 and/or collect data from HVAC devices 607 and HVAC devices 609. In this regard, if second gateway 594 goes offline, first gateway 595 can be configured (e.g., configured with gateway 1 configuration 598) to collect data from HVAC devices 607 in place of second gateway 594. As an example, "Configuration 1" as referred to in FIG. 5E may include a point list for HVAC devices 607. "Configuration 2" as referred to in FIG. 5E may include a point list for HVAC devices 609. Further, "configuration 3" as referred to in FIG. 5E may include a point list for both HVAC devices 607 and HVAC devices 609. For this reason, updating the cloud shadows of logical network representation 532 for first gateway 595 and updating the configuration of first gateway 595, gateway 1 configuration 598, with "configuration 3" may allow first gateway 595 to collect data for both HVAC devices 607 and HVAC devices 609.

At E1, fault manager 526 determines that second gateway 594 is offline and/or experiencing a fault. In some embodiments, fault manager 526 can monitor heart-bit messages and/or use a heart-bit request message as described with further reference to FIG. 12 to determine if second gateway 594 is online. At E2, representation manager 528 may select first gateway 595 to replace second gateway 594 if at E1, fault manager 526 determines that second gateway 5945 is offline and/or experiencing a fault. In some embodiments, first gateway 595 is selected from a plurality of gateways based on a gateway grade as described elsewhere herein.

At E2, representation manager 528 may update first gateway cloud shadow 600 with configuration data from second gateway cloud shadow 599. At E2, representation manger 528 can increment a revision number and generate a new hash based on an updated configuration. First gateway cloud shadow 600 is shown to include configuration 2 while first gateway cloud shadow 601 is shown to include configuration 3. Configuration 3 may be a combination of configuration 1 of second gateway cloud shadow 599 and configuration 2 of first gateway cloud shadow 600. Configuration 3 may allow first gateway 595 to collect data from HVAC devices 607 and HVAC devices 609 (e.g., be a point list for both HVAC devices 607 and HVAC devices 609. In this regard, configuration 3 may include configuration information including a point list for both HVAC devices 607 and HVAC devices 609.

At E3, representation manager 528 may send a check-in command to first gateway 595 causing first gateway 595 to send a request for the current cloud shadow information for first gateway 595 (E4). In response to the request of E4, representation manager 528 may send response 603 to first gateway 595 (E5). Response 603 may include a hash and a revision number for the current cloud shadow of first gateway 595, "CDE" and "2." At E6, first gateway 595 may compare the revision number and the hash number to the current configuration of first gateway 595, gateway 1 configuration 597. In response to determining that the hash of gateway 1 configuration 597 and/or the revision of gateway 1 configuration 597 does not match response 603 (e.g., "ABC" does not match "CDE" and revision 1 does not match revision 2), first gateway 595 sends an update request to representation manager 528 (E7).

At E8, representation manger 518 can send first gateway cloud shadow 601 to first gateway 595 in response to receiving the update request of E7. At E9, first gateway 595 can update gateway 1 configuration 597 with first gateway cloud shadow 601 received at E8. Gateway 1 configuration 598 may allow and/or cause first gateway 595 to collect data from HVAC devices 607 and HVAC devices 609. At E10, fault manager 526 may send a software update, gateway software data 534, to first gateway 595. Fault manager 526 may identify one or more software updates and/or drivers for first gateway 595 that first gateway 595 needs to communicate with HVAC devices 607. This is described elsewhere herein specifically at FIG. 5B and FIG. 13. The software update sent to first gateway 595 by fault manager 526 at E10 may be driver software which allows first gateway 595 to communicate with HVAC devices 607.

Figure 6:
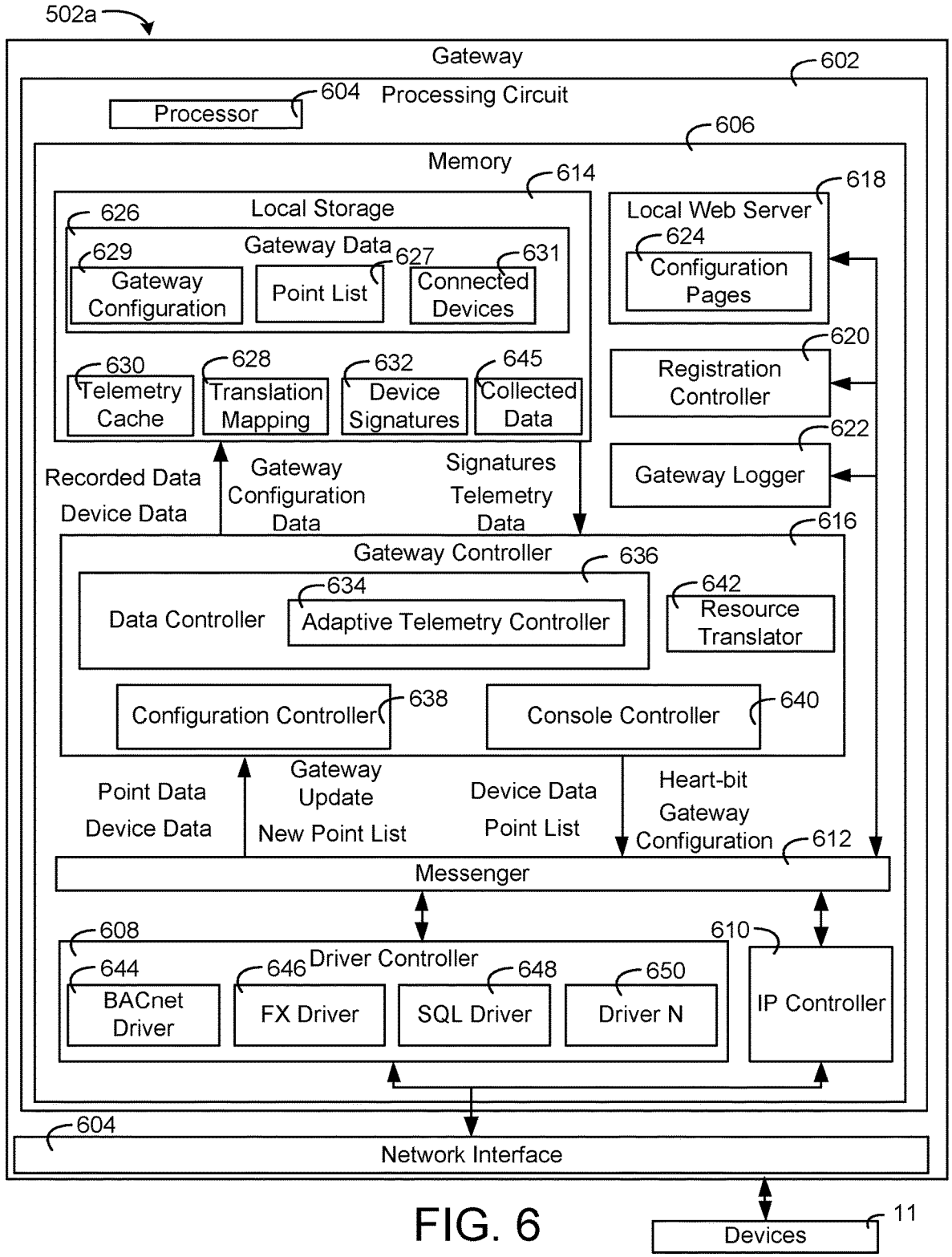
FIG. 6 is a diagram of the gateways of FIGS. 5A-5B shown in greater detail, according to some embodiments.

Referring now to FIG. 6, gateway 502a is shown in greater detail as a representative of gateways 502a-d, according to an exemplary embodiment. Gateway 502a is shown to include processing circuit 602 and network interface 604. Network interface 604 may be any wired or wireless transmitter, receiver, connector, and/or any other network component that enables gateway 502a to communicate via both IP network 506 and non-IP network 508 as described with further reference to FIG. 5. Network interface 604 may allow gateway 502a to communicate with devices connected to non-IP network 508 (e.g., controllers 510a-d, actuators 512a-b, sensors 514a-c, etc.) in addition to communicating with devices connected to IP network 506 (e.g., IP Actuator 516 and building server 504).

Processing circuit 602 is shown to include processor 604 and memory 606. Processor 604 can be a general purpose or specific purpose processor, an application specific integrated circuit (ASIC), one or more field programmable gate arrays (FPGAs), a group of processing components, or other suitable processing components. Processor 604 may be configured to execute computer code and/or instructions stored in memory 606 or received from other computer readable media (e.g., CDROM, network storage, a remote server, etc.).

Memory 606 can include one or more devices (e.g., memory units, memory devices, storage devices, etc.) for storing data and/or computer code for completing and/or facilitating the various processes described in the present disclosure. Memory 606 can include random access memory (RAM), read-only memory (ROM), hard drive storage, temporary storage, non-volatile memory, flash memory, optical memory, or any other suitable memory for storing software objects and/or computer instructions. Memory 606 can include database components, object code components, script components, or any other type of information structure for supporting the various activities and information structures described in the present disclosure. Memory 606 can be communicably connected to processor 604 via processing circuit 602 and can include computer code for executing (e.g., by processor 604) one or more processes described herein.

Memory 606 is shown to include driver controller 608, IP controller 610, messenger 612, gateway controller 616, local storage 614, local web server 618, registration controller 620, and gateway logger 622. Driver controller 608 can be configured to communicate with the devices of building 10 (e.g., controllers 510a-d, actuators 512a-b, sensors 514a-c, etc.). Driver controller 608 can be configured to control one or more drivers that facilitate communication between gateway 502a and the devices of building 10 (e.g., controllers 510a-510d, actuators 512a-b, and/or sensors 514a-c) and/or any device connected to non-IP network 508. Memory 606 may include instructions for modular discrete processes and functions. This separation may provide flexibility in development of the various functions and processes as well as allow for interfacing with various protocols, languages, libraries, and programming styles.

Driver controller 608 is shown to include four drivers, BACnet driver 644, FX driver 646, SQL driver 648, and driver N 650. Driver controller 608 may include any number or type of drivers, as represented by driver N 650. BACnet driver 644 can be configured to facilitate communication between driver controller 608 and various devices in building 10 that may communicate via BACnet protocol. FX driver 646 may be a driver for communicating with a particular type of controller of building 10 (e.g., an FX supervisory controller), SQL driver 648 may be a specific driver for communicating with a relational database and/or any other database (e.g., a database on one of devices 11). In this regard, building 10 may include a database and/or one of devices 11 may include a database. Driver controller 608 may utilize SQL driver 648 to communicate with the database. Driver n 650 represents any other driver that driver controller 608 may include. Driver controller 608 may include any number of drivers for communicating with and controlling devices 11 and/or non-IP network 508.

Driver controller 608 can be configured to start, stop, restart, enable, disable, poll drivers 644-650 for data on an interval (e.g., a fixed interval or a user selected interval for a specific point) and/or otherwise control each driver of driver controller 608. In some embodiments, driver controller 608 starts and/or stops a driver based on a polling rate for a specific data point of point list 627. In some embodiments, driver controller 608 maintains a queue of command for each of drivers 644-650 and executes the commands based on the command queue. Driver controller 608 can be configured to cause a driver to discover a new device in response to a user initiating a "discover new devices command" via a user interface (e.g., configuration pages 624 and/or user device 540). Further, driver controller 608 can be configured to configure and/or reconfigure the drivers in addition to uninstalling drivers and installing new drivers. Driver controller 608 can be configured to cause the drivers to communicate with and receive and/or retrieve data from devices 11. In some embodiments, driver controller 608 may retrieve, receive, and/or query devices 11 for data for a particular point at a fixed interval (e.g., every minute, every five minutes, every fifteen minutes, etc.). In some embodiments, each point may be queried at its own interval. Further, driver controller 608 can be configured to discover points of devices 11. In this regard, driver controller 608 can be configured to "interrogate" devices 11 to discover the points of the devices 11. In some embodiments, driver controller 608 can be configured to "listen" to devices 11 and discover the points of devices 11 based on the data broadcasted over non-IP network 508. For example, one or devices 11 may broadcast a message "looking" for a gateway. If driver controller 608 is "listening" on non-IP network 508, gateway 502a may send a message to the device that broadcast the "looking" message in order to establish a connection between the device and gateway 502a.

In some embodiments, driver controller 608 can be configured to communicate with and/or control BACnet driver 644, FX driver 646, SQL driver 648, and/or driver N 650 via a specific control communication protocol. Further, this same protocol may be used by a user to communicate with the drivers via console controller 640. In some embodiments, the protocol is used by building server 504 (e.g., gateway manager 518) to communicate with and/or control the drivers. The explanation of the protocol below is described with reference to building server 504 communicating with the various drivers.

The protocol may be a communication via various string commands and string responses. In this regard, there may be various line commands such as a request line ("RESULT"), a return line ("RETURN"), and a result line ("RESULT"). The request line may be a request sent from building server 504 to a particular driver for data at a particular point and/or a command to perform a particular action. The request line may include various argument field. The return line may be a reply sent from the particular driver to building server 504 indicating that the driver successfully received the request, has failed to receive the request (e.g., could not identify the point), or if there was a syntax error in the request, while the result line may be the result line of the of a request made by driver controller 608.

The return line may be generated by a driver as an immediate response to receiving a request line from building server 504. The first character of the return line may be "S", "F", or "E". The "S" character may indicate that the driver successfully received the request. The "F" character may indicate that the driver failed to receive the request while the "E" character may indicate that there is a syntax error in the request line, there was a string parsing error, the request line was unrecognized or unsupported, or the request line did not include the correct number of arguments.

The arguments in a particular line may be separated by a space character while various lines may be separated by a carriage return character. The capitalization of command codes for the request line, the return line, or the result line (e.g., "REQUEST", "RETURN", "RESULT") of the request line, the return line, and the result line may be in any capitalization such that RESULTS, Results, rEsulTs, may all be interpreted by building server 504 and/or one of the drivers as the same command. However, various arguments of the request line, the return line, or the result line may be case sensitive.

The result line may include data that the driver collects. In some embodiments, the result line is in a JSON format. When the request line causes the driver to retrieve data from devices 11, the request line may include an invoke number. The invoke number may identify a request number such as a waiting number. This may be necessary when buildings server 504 requests multiple results and/or when there is not currently enough network availability to send the results from the driver to building server 504. The request line sent by building server 504 may be "Read Values <Invoke Number> point-to-check <CRLF>" to which the driver may immediately respond with the "S" character. The driver may hold the results for the particular result until building server 504 requests the results. For example, building server 504 may send the line command "RESULTS <Invoke Number> <CRLF>" which may cause the driver to send the result for the particular result associated with the invoke number to building server 504.

The example below indicates commands sent between driver controller 608 and one of drivers 644-650. The first line indicates version information for a particular driver. This information may be sent when the driver first starts up (e.g., when gateway 502a powers on) or when the "VERSION" command is sent from driver controller 608 to one of the drivers. In some embodiments, after outputting the version information banner, the driver may wait until building server 504 sends it a command. The arguments in the command lines below may be separated by a space character. However, in the event that an argument needs to include the space character, a backslash may be placed in from of the space character to indicate that the space does not represent a division of command line arguments but rather that the space is part of a command line argument.

```
$DriverVersion: 1.0.0 Jul 01 2015 CO\ Madeup\ BAS $
-> VERSION
S$DriverVersion: 1.0.0 Jul 01 2015 CO\ Madeup\ BAS $
->CHECK 100 somepoint.com/point
S
-> Results
S 0
S 1
100 {"point": {"timestamp": July 1 2015 14:30:00", "value":
"Very Hot"}}
-> QUIT
S
```

IP controller 610 can be configured to allow gateway 502a to communicate via IP network 506. In this regard, IP controller 610 may include instructions necessary for communicating via various IP based networks. For example, IP controller 610 may include instructions for communicating via Wi-Fi, Zigbee IP, a wide area network (WAN), an Ethernet network, a 3G network, a 4G LTE network, etc. In this regard, IP controller 610 can facilitate communication between gateway 502a and building server 504 and/or user device 540.

Messenger 612 can be configured to facilitate some and/or all communication for gateway 502a between driver controller 608, IP controller 610, and gateway controller 616. In this regard, messenger can receive device data from devices 11. Messenger 612 can be configured to receive data from devices 11 and provide the data to gateway controller 616. Further, messenger 612 may send device data, and/or a heart-bit to building server 504. Messenger 612 may route received data from building server 504 and/or devices 11 to a particular component of gateway 502a. In some embodiments, messenger 612 is configured to send and/or receive data via IP network 506 and/or non-IP network 508.

Gateway controller 616 can be configured to receive data from devices 11 and send the data to building server 504. Gateway controller 616 is shown to include data controller 636, configuration controller 638, console controller 640, and resource translator 642. Data controller 636 can be configured to receive, retrieve, collect, and/or extract data from devices 11, store the received data in collected data 645, maintain telemetry cache 630, act as a data buffer for receiving data and sending the data to building server 504, and/or query devices 11 for historical data. Data controller 636 is shown to include adaptive telemetry controller 634. Adaptive telemetry controller 634 can be configured to send device data collected, received, and/or extracted from devices 11 to building server 504. Adaptive telemetry controller 634 can be configured to send device data to building server 504.

Data controller 636 can be configured to query, receive, extract, and/or retrieve data from devices 11 at a first interval. Adaptive telemetry controller 634 can be configured to transmit the data collected by data controller 636 at the first interval. The first interval may be based on a sampling rate of a particular data point that may be stored in point list 627. Further, adaptive telemetry controller 634 can be configured to send device data to building server 504 whenever building server 504 requests data. In various embodiments, adaptive telemetry controller 634 can be configured to redirect collected data to another gateway. In some embodiments, adaptive telemetry controller 634 receives a request from building server 504 to send recorded data to a second gateway and adaptive telemetry controller 634 can respond accordingly. Adaptive telemetry controller 634 can be configured to send a request to building server 504 requesting that another gateway perform the data transmission for gateway 502a in response to determining that gateway 502a must meet a network data usage constraint.

Transmitting device data to building server 504 at the first interval may be referred to as a constant data rate (CDR). CDR may be defined as a number of bits per minute. In the equation below, Message Size may be the in units of bytes/message while the number of Messages Per Minute may be in units of messages/minute thus resulting in a CDR that is in units of bytes/minute:

$$CDR = (Message\ Size) * (Messages\ Per\ Minute)$$

However, the data collected by data controller 636 may not be entirely destined for building server 504. Instead, adaptive telemetry controller 634 can be configured to send the recorded data to building server 504 at a second longer interval and/or whenever the data changes value (e.g., changes by a predefined amount). For example, data controller 636 may record data every minute over a four minute interval for a particular data point of one of devices 11, data controller 636 may receive four data points e.g., 50, 52, 52, and 53. The second interval may be two minutes. Of the four data points, 50, 52, 52, and 53 that are recorded by data controller 636, adaptive telemetry controller 634 may only send 52 and 53. Further illustration of the collected data and the data sent to building server 504 can be seen in FIG. 15.

Data controller 636 can be configured to synchronize data stored on gateway 502a (e.g., collected data 645) with the data stored on building server 504 (e.g., telemetry data 542). Further, data controller 636 can be configured to convert data points that it collects into a format such as a time-series data format. The time-series data can be stored in collected data 645 and/or can be sent to building server 504.

Both the second interval and the first interval may be predefined amounts of time. The time of the second interval may be an integer multiple of the time of the first interval. For instance, if the first interval is 10 minutes, the second interval might be 20 minutes, 30 minutes, 40 minutes, etc. Similarly, if the first interval is 3.78 seconds, the second interval may be 7.56 seconds, 11.34 seconds, 15.12 seconds, etc. The second interval may be an integer multiple of the first interval so that when the second interval occurs, the first interval occurs concurrently.

In some embodiments, adaptive telemetry controller 634 is configured to determine the second interval based on a data transmission limit in order to lower bandwidth usage of gateway 502a. The data transmission limit may limit the amount of data transmitted over IP network 506 so that one gateway does not consume the entire bandwidth of IP network 506. In various embodiments, the data transmission limit is based on a cost for purchasing data from a service provider (e.g., 5 TB/month data cap, 500$/TB, etc.).

For example, building server 504 may send a transmission limit based on a billing period for IP network 506 to gateway 502a. An owner of building 10 may have a contract with one or more providers of IP network 506 for 20 GB of data transmission every month. Building server 504 may notify gateway 502a that it can send one fourth of the total available data to building server 504 since there are four total gateways in building 10. In this regard, adaptive telemetry controller 634 may calculate the second interval based on available data (e.g., 5 GB of data). Adaptive telemetry controller 634 may be configured to monitor the amount of data available and periodically recalculate the second interval so that adaptive telemetry controller 634 does not exceed a data requirement for a particular time period (e.g., 5 GB of data available to gateway 502a every month). However, adaptive telemetry controller 634 can be configured to round the determined second interval so that the second interval is an integer multiple of the first interval. For example, if the adaptive telemetry controller 634 determines that the second interval should be 9.5 minutes but the first interval is 3 minutes, adaptive telemetry controller 634 can be configured to round the second interval to 9 minutes so that the second interval is an integer multiple of the first interval.

Adaptive telemetry controller 634 may further determine the second interval based on an allocation of available data usage to device data. For example, adaptive telemetry controller 634 may determine that of a particular amount of data allocated to gateway 502a, only a portion of the gateway can be allocated for transmitting device data. For example, adaptive telemetry controller 634 may determine that half of the available data should be allocated to transmitting point lists and gateway configurations to building server 504 while the other half of the available data can be allocated to sending collected device data to building server 504.

In some embodiments, adaptive telemetry controller 634 does not use a first interval to sample data and a second interval to transmit data, rather, adaptive telemetry controller 634 may only use a single interval to do both the sampling and the data transmitting. Adaptive telemetry controller 634 may sample a data point at the second interval and transmit the data at the second interval. This second interval may be longer than a sampling interval of the particular data point. For example, a data point may have a sampling rate of 5 minutes. Rather than sampling the data point at the five minute interval, adaptive telemetry controller 634 can be configured to sample the data point every ten minutes and send the sampled data immediately to building server 504. Adaptive telemetry controller 634 may also send data to building server 504 whenever the data changes by a predefined amount and/or changes at all. In this regard, adaptive telemetry controller 634 can be configured to causes devices 11 to send data to adaptive telemetry controller 634 whenever their data points change and/or have changed by a predefined amount. Whenever the data is received by adaptive telemetry controller 634, adaptive telemetry controller 634 can be configured to send the receive an indication that data has changed value from one of devices 11.

Data controller 636 can be configured to read historical data from devices 11 via driver controller 608. In some embodiments, data controller 636 can send the read data to building server 504. One or more of devices 11 may record data locally and generate a historical list of data for one or more points of the particular device. Data controller 636 can be configured to read the historical data automatically and/or upon request from a user (e.g., a request from console controller 640 and/or local web server 618) and/or building server 504. In some embodiments, a custom time range for reading the historical data may be identified in the request and thus, data controller 636 can be configured to read historical data from devices 11 for a predefined time period and/or all of the historical data in its entirety. While data controller 636 reads the historical data, data controller 636 can be configured to display an indicator to an output console (e.g., console controller 640) and/or via local web server 618 indicating that the historical data copy is in progress. The historical data copy process may run in the background, gateway 502a can be configured to continue to perform other processes and/or receive commands from a user via console controller 640, local web server 618, and/or via building server 504. The historical data copy may overwrite any previous readings and/or may undergo various data operations such as data cleansing (e.g., limiting, compressing, interpolating, etc.). Upon finishing reading historical data, the data and/or an indicating of correctly reading the historical data may be displayed in console controller 640 and/or local web server 618 and/or logged by gateway logger 622. Further, an indication may be displayed and/or logged which identifies any errors encountered while reading the historical data.

Configuration controller 638 can be configured to manage a gateway configuration of gateway 502a. Configuration controller 638 can be configured to receive point data from devices 11 and maintain point list 627 of local storage 614. Point data may be data which indicates a particular data point and/or properties for that particular data point. In this regard, configuration controller 638 can be configured to perform point discovery with devices 11, request data from devices 11, and/or send instructions to devices 11. Further, configuration controller 638 can be configured to send the point list to building server 504. In some embodiments, configuration controller 638 can be configured to generate a "short" point list. The short point list may be an abstraction of point list 627 and may remove various information to minimize the size of the point list sent to building server 504. For example, a short list may include each data point of devices 11 but may not include the units for the data points, sampling rate, etc.

In some embodiments, configuration controller 638 can be configured to request and/or receive software updates for gateway 502a. Further, configuration controller 638 can be configured to delete data points from point list 627 and/or add points to data point list 627. In some embodiments, when configuration controller 638 receives a second point list from building server 504 for an unresponsive gateway, configuration controller 638 may update point list 627 with the second point list. Configuration controller 638 can be configured to synchronize point list 627 with building server 504 (e.g., logical network representation 532).

Configuration controller 638 can be configured to receive gateway updates (e.g., new drivers) and a new point list. In some embodiments, if gateway 502*a* takes over controlling the devices of an unresponsive gateway of building 10, configuration controller 638 can be configured to receive software updates from building server 504. For example, the unresponsive gateway may have been communicating with a particular sensor via CAN protocol. In this example, configuration controller 638 may receive a CAN driver and install the CAN driver via driver controller 608. Further, configuration controller 638 can be configured to receive the point list (e.g., a new point list) for the unresponsive gateway from building server 504. Configuration controller 638 can be configured to update point list 627 with the new point list received from building server 504.

Configuration controller 638 can be configured to update connected devices 631 of local storage 614. Connected devices 631 may identify the devices (e.g., devices 11) connected to gateway 502*a*. Configuration controller 638 can be configured to send connected devices 631 to building server 504 so that representation manager 528 can update logical network representation 532 with the devices connected to gateway 502*a*.

Console controller 640 can be configured to allow a user to access and control various components of gateway 502*a*. Console controller 640 can be configured to be connected to local web server 618, in this regard, console controller 640 may receive console instructions from local web server 618. In various embodiments, console controller 640 can be configured to connect to a serial port and/or other data interface (e.g., network interface 604) and receive console instructions. In some embodiments, the console instructions are instructions to start a driver, stop a driver, restart a driver, sample a particular data point, and/or any other console based command.

In some embodiments, the console instructions are to synchronize connected devices 631 and/or point list 627 with building server 504, synchronize point list 627 with building server, discover devices (e.g., devices 11) connected to gateway 502*a*, find all the points of the various devices connected to gateway 502*a*, retrieve data from the devices based on data age parameters which specify an "oldest" date and time and a "newest date" and time (e.g., retrieve all data between 12:00 P.M. and 12:10 P.M. for a particular device), poll a device for data, retrieve a particular data point, retrieve the status of a particular driver or drivers, test the connection between gateway 502*a* and devices 11, and/or other various commands.

Resource translator 642 can be configured to translate data from a first format to a second format. In some embodiments, the data collected by gateway controller 616 is translated from a first format to a second format by resource translator 642. For example, one or more of devices 11 may send data to gateway 502*a* that is in a first data format. Resource translator 642 may retrieve translation mapping 628 from local storage 614 and use translation mapping 628 to translate the data from the first format into a second format. Translation mapping 628 may be a map and/or all of the translation rules to translate data from a first format to a second format.

Resource translator 642 may enable data received by gateway controller 616 that originates from a legacy piece of equipment to be translated to a new and/or a current data format. For example, the legacy equipment may send data to gateway controller 616 that is formatted as a legacy data model. Resource translator 642 may use translation mapping 628 to convert the data into a new data model (e.g., JavaScript Object Notation (JSON)). Resource translator 642 may run periodically (e.g., to convert data that may be stored in local storage 614) and/or on demand (e.g., when any new data is received by gateway controller 616 that requires translating.

In some embodiments, resource translator 642 can be configured to perform various hashing and/or checksum operations. For example, resource translator 642 can be configured to determine if any properties of devices 11 have changed by periodically generating a signature based on the properties and comparing the signature to a previous signature. The properties may be properties of point data received by gateway controller 616 from devices 11. In response to determining that the signatures do not match, resource translator 642 can be configured to send an alert message to building server 504 indicating that an operator may need to manually update the properties of a particular device.

Local storage 614 is shown to include gateway data 626, collected data 645, device signatures 632 for devices 11, and telemetry cache 630. Gateway data 626 can be data pertaining to gateway 502*a*. In some embodiments, gateway data 626 is a cloud shadow for gateway 502*a* as describe with further reference to FIGS. 5B-5C. For this reason gateway data 626 is shown to include gateway configuration 629 and point list 627. Gateway configuration 629 may include data pertaining to the current software configuration of gateway 502*a* and/or the drivers installed in gateway 502*a*. In this regard, gateway configuration 629 may be a log of the current software installed on gateway 502*a*. Point list 627 may include point data pertaining to devices 11. In some embodiments, point list 627 includes each data point which gateway 502*a* is configured to receive data from and/or send commands to. For example, point list 627 may indicate that gateway controller 616 should sample a thermistor temperature sensor of devices 11 every five minutes. In various embodiments, point list 627 may indicate that gateway controller 616 should send a zone setpoint received from building server 504 to devices 11.

Registration controller 620 can be configured to perform a registration process with building server 504. In some embodiments, registration controller 620 may send various data (e.g., point list 627, gateway configuration 629, and/or connected devices 631) to building server 504. In some embodiments, registration controller 620 automatically registers gateway 502*a* when gateway 502*a* is first connected with building server 504 (e.g., when gateway 502*a* is first installed in building 10) and/or when point list 627 changes.

Gateway logger 622 can be configured to generate and/or store a log of the activity of gateway 502*a*. Gateway logger 622 can be configured to store a log of all faults that gateway 502*a* may encounter. Further, gateway logger 622 can be configured to monitor gateway performance and create a log of gateway performance. Gateway performance may include network usage, processing usage, memory usage, etc. In some embodiments, requests received from building server 504 and/or devices 11 can be logged by gateway logger 622. The requests may be a request to read data from devices 11, operate devices 11 in a particular manner, etc. In some embodiments, gateway logger 622 can periodically send the logs stored by gateway logger 622 to building server 504. In various embodiments, building server 504 can query gateway logger 622 for fault data.

Local web server 618 can be configured to host a web server on gateway 502a. In this regard, a user may access gateway 502a via local web server 618 (e.g., via user device 540). Local web server 618 is shown to include configuration pages 624. Configuration pages 624 may be web pages that allow a user to modify the operation of gateway 502a and/or devices 11. For example, a user, via user device 540, may enter via configuration pages 624 that they want adaptive telemetry controller 634 to operate in a CDR mode rather than operating in an ADR mode. In another example, a user, via user device 540, can enter via configuration pages 624 that they want a particular device to operate in a particular manner (e.g., sample data at a predefined rate, add a temperature offset to a measured temperature, etc.).

Figure 7:
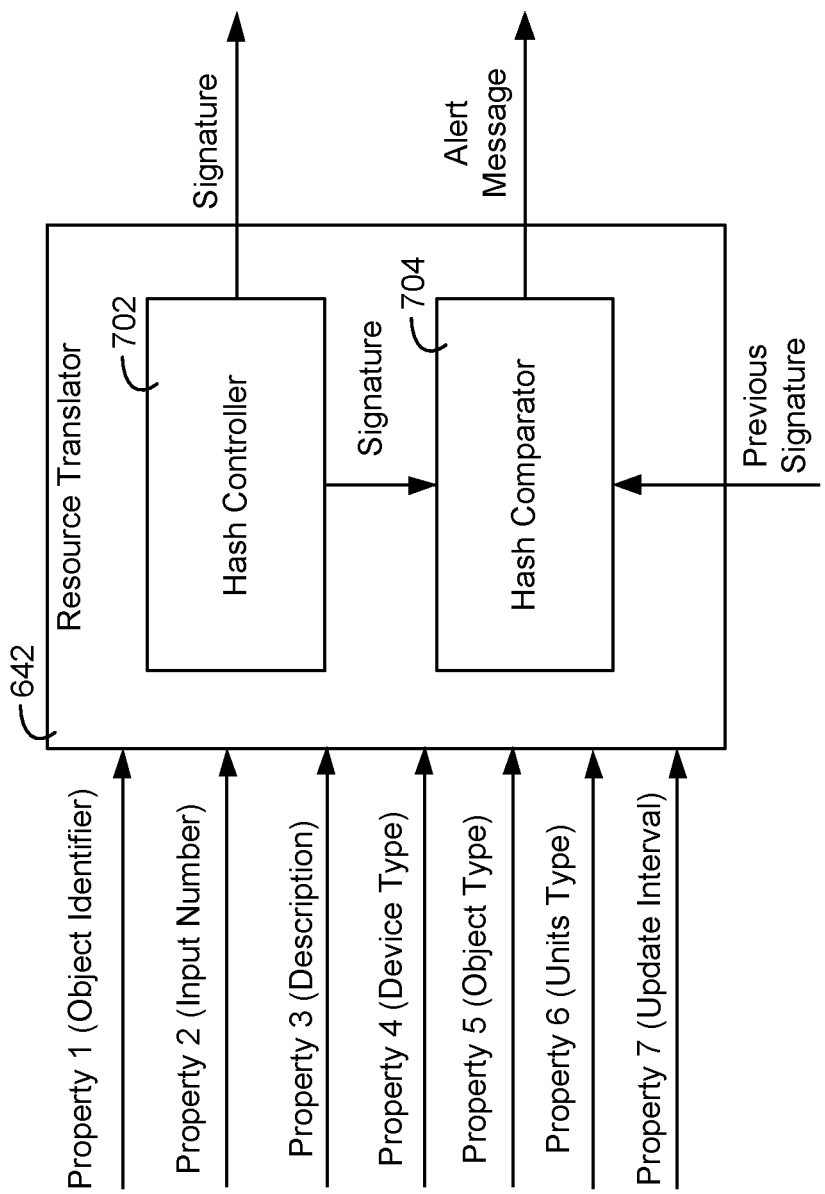
FIG. 7 is a block diagram of a resource translator of the gateways of FIGS. 5A-5B and 6 according to some embodiments.

Referring now to FIG. 7, resource translator 642 of gateway 502a is shown in greater detail, according to some embodiments. Resource translator 642 is shown to include hash controller 702 and hash comparator 704. Resource translator 642 is shown to receive properties 1-4. In some embodiments, resource translator 642 receives point data which includes various properties (e.g., properties 1-4). The point data may be received and/or retrieved by gateway controller 616 from devices 11. The properties may be properties of one of devices 11 and/or one or more data points of one and/or all of devices 11. In FIG. 7, the signature being generated is for a particular data point of one of devices 11, however, the signature may be generated for one or devices 11 and/or any other devices connected to gateway 502a such as devices managed by a second unresponsive gateway that gateway 502a takes over managing. Property 1 may be an object identifier which identifies a particular data point. Property 2 may be an input number. For example, a single sensor may have multiple inputs and the input number may identify one particular input. Property 3 may be a data point description. For example, the data point description may be a string such as, "Return Air Temperature." Property 4 may be a device type. For example, the device type may be a string such as, "Thermistor." Property 5 may be an object type, for example, a string such as "Analog Input." Properties 6 and 7 may be units and an update interval respectively. For example, property 6 may be a string such as, "DEG_F" which indicates degrees Fahrenheit. Finally, the update interval may be a string such as "15 minutes" which indicates a fifteen minute update rate of the return air temperature.

Hash controller 702 can be configured to perform any kind of hashing. In some embodiments, hash controller 702 can be configured to perform various hashing functions such as MD5 hashing, SHA-1 hashing, and/or any other hashing. In some embodiments, the hash function used by hash controller 702 for performing the hashing is stored in translation mapping 628. For this reason, hash controller 702 can be configured to retrieve a hash function (e.g., an MD5 hash function) from translation mapping 628. Hash controller 702 can be configured to generate a signature by using all seven of the properties as inputs to a hashing function of hash controller 702. Hash controller 702 can be configured to communicate the signature it generates to hash comparator 704.

Hash comparator 704 can be configured to receive the signature and can also be configured to retrieve and/or receive a previous signature from local storage 614 (e.g., device signatures 632). The previous signature can be a signature that was previously determined by hash controller 702. Hash comparator 704 can be configured to compare the signature to the previous signature. In response to determining that the signature does not match the previous signature, hash comparator 704 may generate an alert message. The alert message may indicate that one of the properties of the device and/or device point has changed. In this regard, operator assistance may be needed to correct the properties on one of devices 11 or may need to correct the point list of gateway 502a. For this reason, resource translator 642 can be configured to transmit the alert message to local web server 618 (e.g., configuration pages 624) which can be configured to display the alert on one of configuration pages 624. Further, resource translator 642 can be configured to transmit the alert message to building server 504. Building server 504 may send a notification to an operator indicating that there is a signature miss-match.

Referring again to FIG. 5B, representation manager 528 can be configured to perform the hashing described with reference to FIG. 7 and resource translator 642 to maintain a signature for a particular gateway, gateway 502a. For example, point list 576 and/or point list 580 may include various properties of gateway 502a and/or points managed by the particular gateway. Representation manager 528 can be configured to generate a signature value for the particular gateway based on all and/or some of the various properties. Further, representation manager 528 can be configured to receive a signature generated by gateway 502a based on all of the various properties stored locally on the particular gateway. In this regard, representation manager 528 can be configured to compare the signature that it generates to the signature that it receives from gateway 502a to determine if any of the properties of gateway 502a have changed.

Further, resource translator 642 may receive a signature from representation manager 528. Resource translator 642 may generate a signature value and compare the signature value it generates to the signature it receives from representation manager 528 to determine if the signatures match. When either resource translator 642 and/or representation manger 528 identifies that the signatures do not match, an alert message may be generated identifying the point and/or object which has inconsistent properties between what is stored on gateway 502a and in logical network representation 532.

Figure 8:
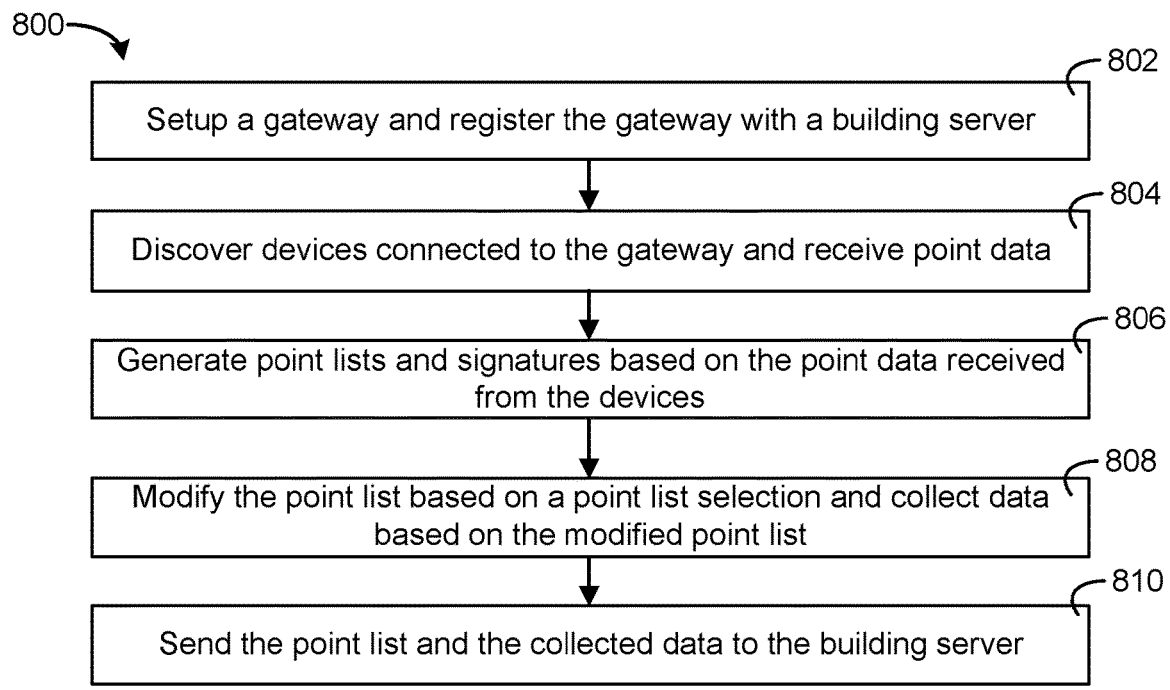
FIG. 8 is a flow diagram for discovering the controllers, actuators, and sensors of FIG. 5A and data points for the controllers, actuators, and sensors with the gateways of FIG. 5A, according to some embodiments.

Referring now to FIG. 8, process 800 is shown for setting up a gateway in a building 10 and connecting the gateway with devices, according to an some embodiments. One of gateways 502a-d and/or building server 504 can be configured to perform process 800. Process 800 is explained with reference to gateway 502a and the various components of 502a. However, it should be understood that any gateway of building 10 (e.g., gateways 502a-d) can be configured to perform process 800.

At 802, gateway 502a may be installed in building 10 and connected to devices 11 via non-IP network 508 and connected to building server 504 via IP network 506. Registration controller 620 may register gateway 502a with building server 504 by sending various identifiers of gateway 502a to building server 504. In some embodiments, gateway 502a may configure various drivers for communicating with devices 11 in response to being installed and/or powered on.

At 804, driver controller 608 can discover devices (e.g., devices 11) that are connected to gateway 502a. In some embodiments, driver controller 608 can "listen" for devices 11, i.e., wait for devices 11 to communicate to gateway 502a and send point data to gateway 502a. In various embodiments, when driver controller 608 identifies devices 11, driver controller 608 can "interrogate" devices 11 for point data by querying and/or requesting point data from devices 11. In some embodiments, at 804, driver controller 608 can configure and/or initiate drivers (e.g., BACnet driver 644, FX driver 646, etc.).

At 806, configuration controller 638 can generate a point list based on the point data received by driver controller 608 at 804, and resource translator 642 can generate a signature for each data point and/or each of devices 11 (i.e., controller 510*a* and actuator 512*b*). Configuration controller 638 can store the point list in local storage 614 while resource translator 642 can store the signatures in local storage 614. At 808, local web server 618 can present the point list of step 806 to a user via user device 540, configuration pages 624, and/or can send the point list to building server 504. In this regard, configuration controller 638 may receive a modification to the point list from one or both of local web server 618 and user device 540. The modified point list may select points of all the discovered data points that a user is interested in. In various embodiments, the modification indicates a particular sampling rate of a data point, a particular unit for the data point, etc. In some embodiments, configuration controller 638 can send modifications to the points to devices 11.

Figure 9:
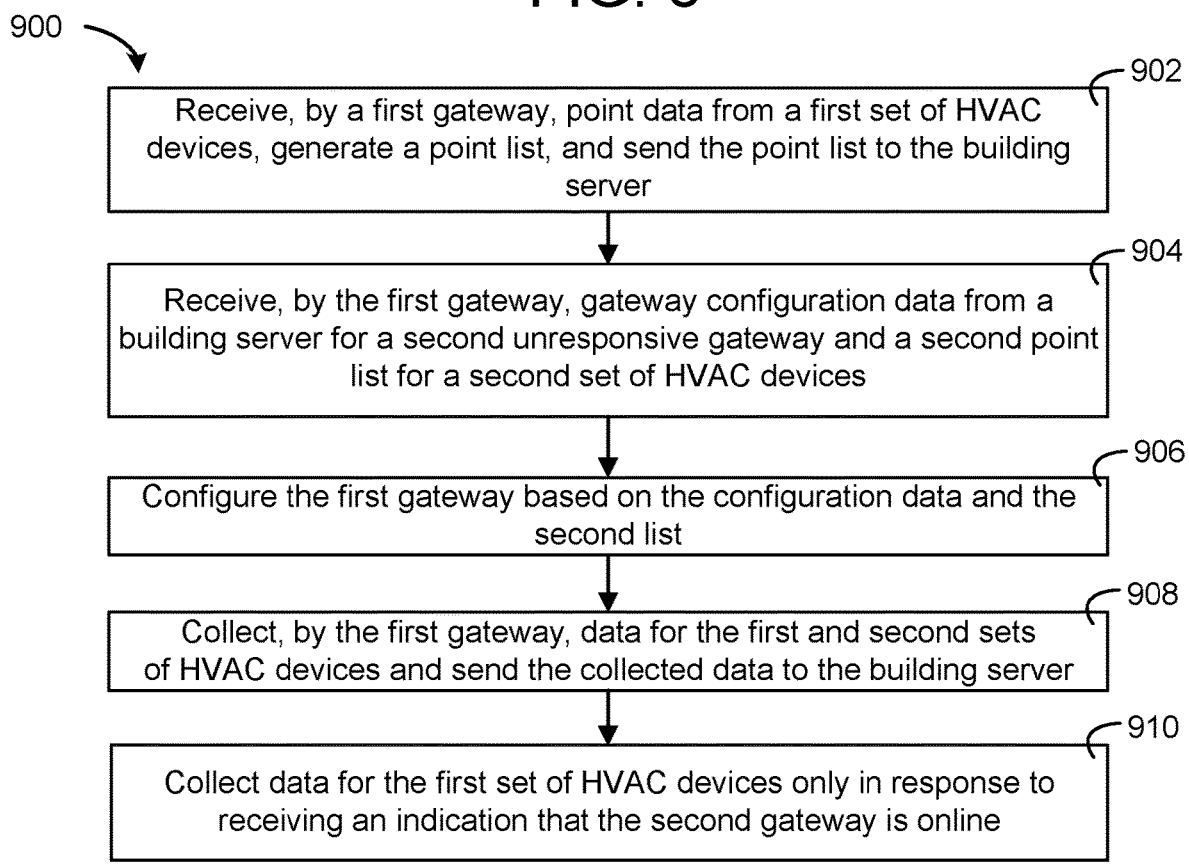
FIG. 9 is a flow diagram of a first gateway taking over the device managing duties of a second unresponsive gateway, according to some embodiments.

Referring now to FIG. 9, a process 900 for collecting data for a first set of HVAC devices by a first gateway and expanding the functionality of the first gateway to collect data for a second set of HVAC devices is shown, according to an exemplary embodiment. Gateways 502*a-d* and building server 504 can all be configured to perform process 900. For this example, the first gateway referred to in process 900 may be gateway 502 and the first set of HVAC devices referred to in process 900 may be controller 510*a* and actuator 512*b*. The second gateway referred to in process 900 may be controller 510*b*. Further, the second set of HVAC devices referred to in process 900 may be controller 510*b*, actuator 512*a*, and/or sensors 514*a*.

At 902, a first gateway receives point data from a first set of HVAC devices. The HVAC devices may be devices communicably coupled to the first gateway. Receiving point data and setting up a gateway are described with further reference to process 800 of FIG. 8. Based on the point data, the first gateway can generate a point list. The point list may be data points that the first gateway collects data from and/or sends control commands to. In some embodiments, a user selects, via a user interface (e.g., configuration pages 624 and/or user device 540), data points to be included in the point subscription list based on the point data received from the first set of HVAC devices.

At 904, the first gateway receives, from building server 504, configuration data for a second gateway and a subscription list for a second set of HVAC devices originally managed by the second gateway. The second gateway may be a gateway which is not connected and/or has failed to properly communicate with building server 504. Building server 504 can be configured to identify that the second gateway is unresponsive and select a replacement for the second gateway from a plurality of gateways based on various metrics (e.g., a processing metric and a network metric) for each of the plurality of gateways.

In process 900, building server 504 selects the first gateway to replace the second unresponsive gateway. The configuration data received by the first gateway may be software necessary for properly communicating with the second set of HVAC devices. For example, the software may be a specific driver for a particular brand of HVAC controllers that the first gateway does not have installed.

At 906, the first gateway can be configured based on the configuration data and the second subscription list. In some embodiments, the first gateway installs various software add-ons (e.g., drivers) included in the configuration data, the software add-ons necessary for communicating with, controller, and/or receiving data from the second set of HVAC devices. Further, the first gateway may combine the first point subscription list and the second subscription list. In some embodiments, the first gateway generates a single point subscription list but keeps a partition between the points of the first subscription list and the second subscription list to keep track of which devices are "inherent," i.e., purposely connected to the first gateway (e.g., the first set of HVAC devices), and which devices have to be subsequently added from offline devices (e.g., the second set of HVAC devices).

At 908, based on the first and second point subscription lists, the first gateway can collect data for the first set of HVAC devices and the second set of HVAC devices. The first gateway can send the collected data for the first and seconds sets of HVAC devices to building server 504. In some embodiments, building server 504 sends instructions and/or commands for the first and/or second sets of HVAC devices. The first gateway can send the instructions and/or commands to the appropriate HVAC devices.

At 910, the first gateway may receive an indication from building sever 504 that the second gateway has become responsive and that the second gateway will resume managing the second set of HVAC devices. In this regard, the first gateway may send an updated point subscription list to the building server. The updated point subscription list may include any changes to the point subscription list for the first set of HVAC devices that have occurred since the first gateway took over managing the second set of HVAC devices. In various embodiments, the first gateway sends the updated point subscription list to building sever 504 periodically and/or whenever the point subscription list of the second set of HVAC devices changes. Further, the first gateway may stop managing the second set of HVAC devices and only manage the first set of HVAC devices. In this regard, the first gateway may only collect data for the first set of HVAC devices and send the collected data for the first set of HVAC devices to building server 504.

Figure 10:
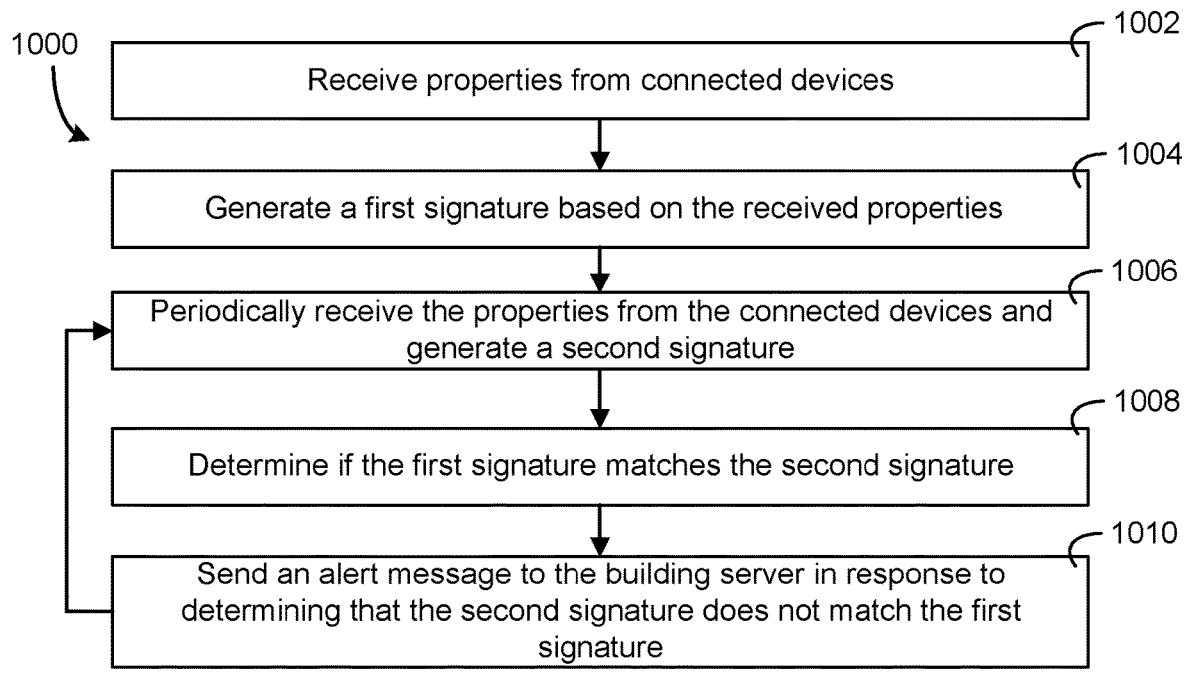
FIG. 10 is a flow diagram of using a signature to determine if properties of one of the controllers, actuators, or sensors of FIGS. 5A-5B have changed, according to some embodiments.

Referring now to FIG. 10, a process 1000 for using signatures to identify changes in point configuration of devices is shown, according to some embodiments. Gateways 502*a-d* and/or building server 504 can be configured to perform process 1000. Process 1000 is described with reference to gateway 502*a* and the various components of gateway 502*a*. However, it should be understood that any gateway, gateways 502*a-d*, and/or building server 504 can be configured to perform process 1000.

At 1002, resource translator 642 can receive one or more properties of the points of devices 11. In some embodiments, the properties are properties of data points received from devices 11. Step 1002 may be performed during gateway registration which is further described with reference to FIG. 8. At 1004, hash controller 702 can generate a signature by hashing all of the properties received by resource translator 642. In some embodiments, the signature includes all of the properties of all of the data points of one of devices 11. In various embodiments, hash controller 702 generates multiple signatures for each data point of each device of devices 11. In some embodiments, resource translator 642 generates one or more signatures for each of devices 11. In some embodiments, resource translator 642 creates a single signature for the gateway from properties of the gateway and/or from properties of various points of gateway 502*a* (e.g., point list 627).

For example, if a particular device of devices 11 has five data points each with five properties, hash controller may hash all twenty five properties to generate a single signature or may hash each of the five sets of properties to generate five signatures for each data point of the particular device of devices 11. At 1006, configuration controller 638 can query devices 11 for point data periodically. In some embodiments, configuration controller 638 retrieves new point data every minute, every hour, and/or based on any other schedule (e.g., upon a state change, upon a network interruption, etc.). In some embodiments, gateway 502*a* can discover data points for connected devices periodically. Based on the new point data, hash controller 702 can calculate a new signature.

Hash comparator 704 can compare the new signature to the signature calculated at 1004. In response to the signatures not matching, comparator 704 can generate an alert message. Comparator 704 can send the alert message to building server 504 and/or can send the alert message to local web server 618. In this regard, user device 540 may access the alert message via local web server 618. In some embodiments, comparator 704 can send the alert message directly to user device 540. For example, user device 540 may be a device of a technician of a building. If there is a mismatch between signatures, the technician may receive the alert message indicating that the technician needs to correct the configuration of one of devices 11.

Figure 11:
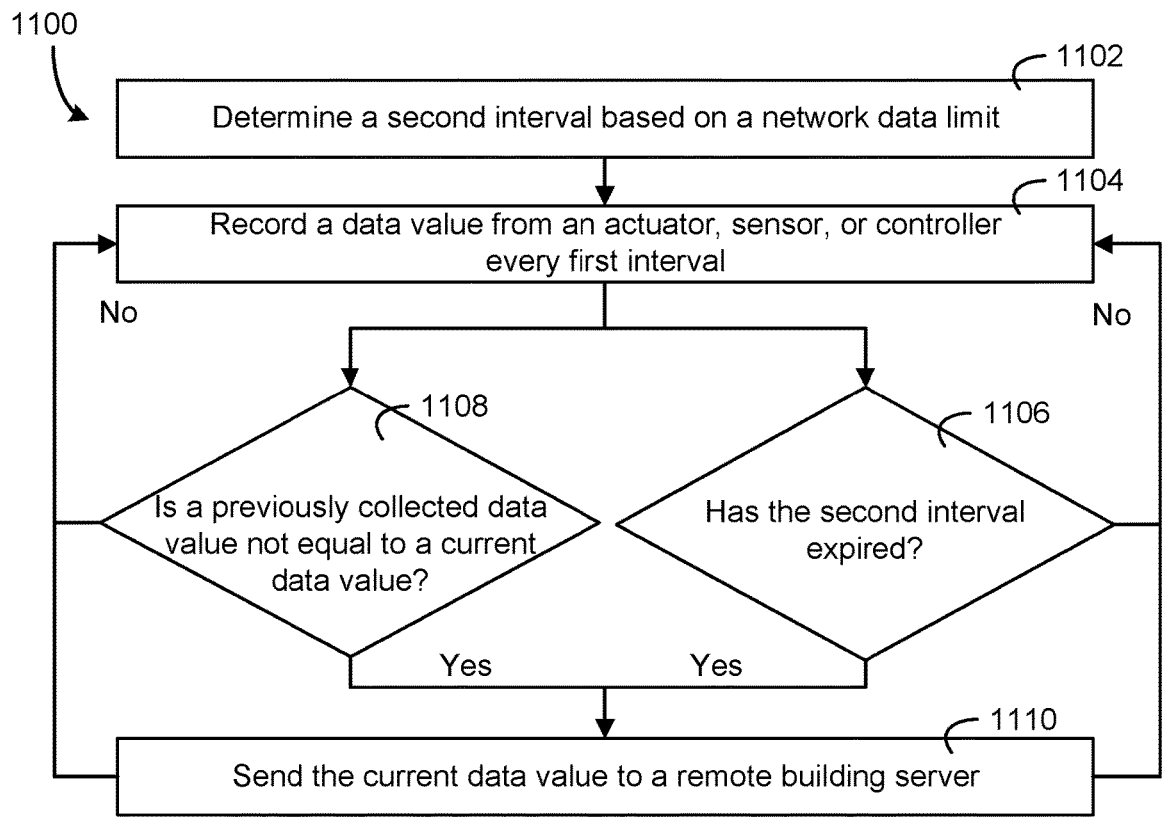
FIG. 11 is a flow diagram of collecting data from the controllers, actuators, and sensors of FIGS. 5A-5B with the gateway of FIG. 5A and sending the collected data to the building server of FIGS. 5A-5B, according to some embodiments.

Referring now to FIG. 11, a process 1100 for recording data from one or more devices and sending the data to a server is shown, according to some embodiments. Gateways 502*a*-502*d* can be configured to perform process 1100. Process 1100 describes sampling data for a particular data point, however, it should be understood that gateways 502*a*-*d* can perform process 1100 for a plurality of data points for a plurality of devices. This may be understood as multiple implementations of process 1100, each implementation for a particular data point. Although process 1100 is described with reference to gateway 502*a* and the various components of gateway 502*a*, it should be understood that any gateway of gateways 502*a*-*d* can be configured to perform process 1100.

At 1102, adaptive telemetry controller 634 can determine a second interval, an interval for sending data to building server 504. In some embodiments, adaptive telemetry controller 634 determines the second interval based on the network data allowance as described with further reference to FIG. 5A. The data allowance may be the network data which adaptive telemetry controller 634 can be configured to use in a predefined amount of time. At 1104, data controller 636 can record data values (e.g., collect and/or extract) from devices 11 at a first interval. The first interval may be a sampling interval associated with the particular data point and may be based on point list 627. The recorded data values may be data values for a particular point of one of devices 11. In some embodiments, the first interval is shorter than the second interval determined at 1102. In some embodiments, the second interval is an integer multiple of the first interval. In this regard, whenever the second interval occurs, data controller 636 will have simultaneously recorded and/or collected (e.g., extracted) a data value at the first interval. At steps 1108 and 1106, adaptive telemetry controller 634 checks two conditions. These conditions can be collectively understood and/or implemented as a single "or" condition.

At 1106, adaptive telemetry controller 634 determines if the second interval has expired. In response to the second interval expiring, adaptive telemetry controller 634 can perform step 1110. If the second interval has not expired, adaptive telemetry controller 634 can perform step 1104.

Similarly, at 1108, adaptive telemetry controller 634 can determine if a previously recorded data value for a particular data point is different than a currently recorded data value for the particular data point, i.e., has the data value changed. In some embodiments, at 1108, adaptive telemetry controller 634 determines if the previously recorded data value has changed by more than a predefined amount. In response to determining that the data value has changed and/or has changed by more than a predefined amount, adaptive telemetry controller 634 can perform step 1110. In response to determining that the data value has not changed, adaptive telemetry controller 634 can perform step 1104.

At 1110, adaptive telemetry controller 634 can send a current data value to building server 504. The current data value may be a data value which is different than a previously measured data value as determined in step 1108, or may be a data value collected at the when the second interval expires as determined in step 1106. In various embodiments, steps 1108 and 1106 can be simultaneously true and therefore the data value which adaptive telemetry controller 634 can send to building server 504 may have been collected when the second interval expired and when the data value changes from a previous value.

Figure 12:
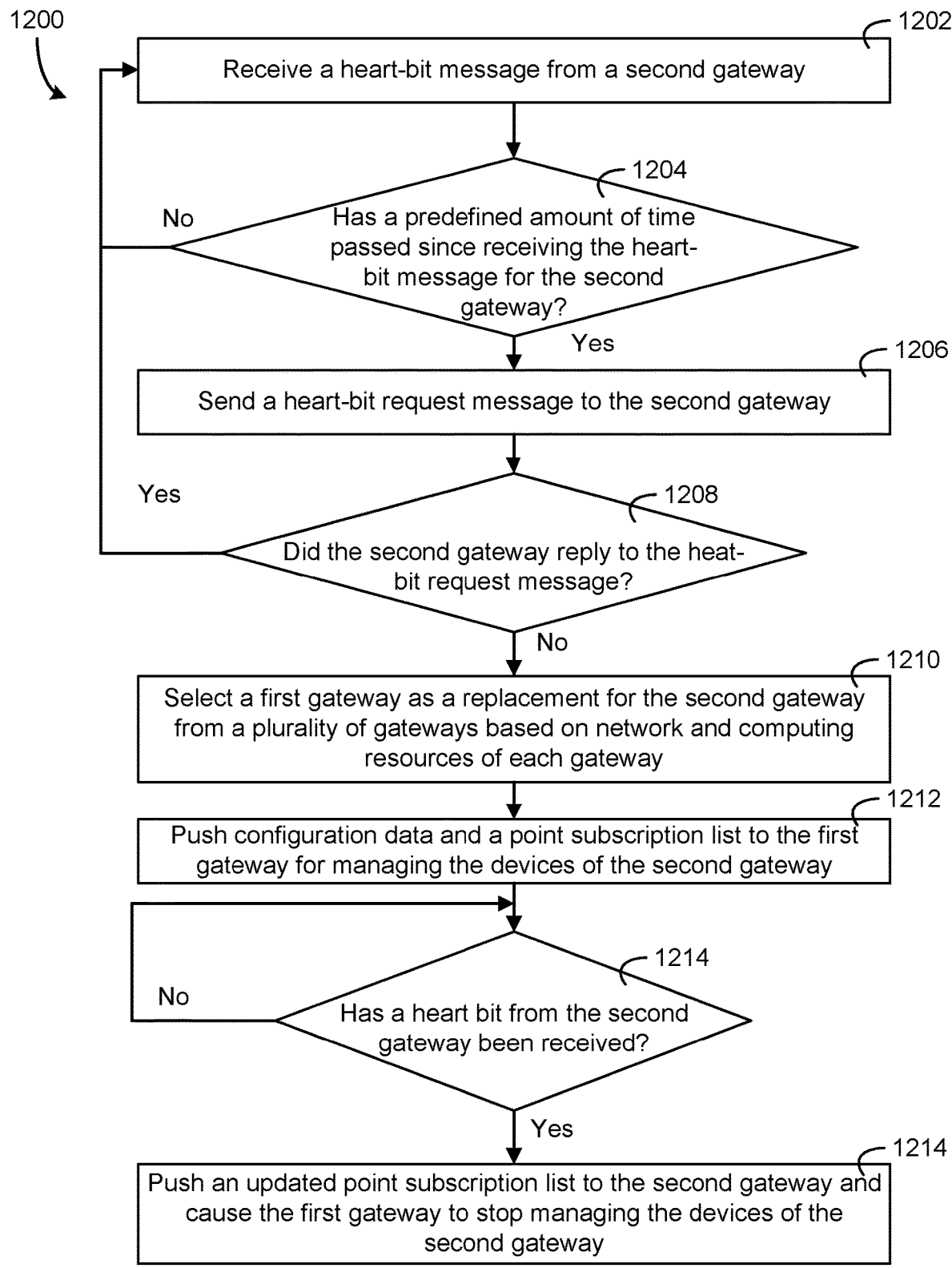
FIG. 12 is a flow diagram of determining the health of the gateways of FIG. 5A with the remote building server of FIG. 5 and pushing configuration data from one of the gateways of FIG. 5A to another gateway of FIG. 5A, according to some embodiments.

Referring now to FIG. 12, a process 1200 for determining the network status of gateways and causing a first gateway to manage devices of a second gateway in response to determining that the second gateway is unresponsive, according to an exemplary embodiment. Building server 504 and/or gateways 502*a*-*d* can be configured to perform process 1200. Process 1200 may be understood with respect to gateway 502*a* and 502*b*. For example, the first gateway of process 1200 may be gateway 502*a* while the second gateway may be gateway 502*a*. Similarly, the devices of the second gateway may be controller 510*b*, actuator 512*a*, and sensor 514*a*. Process 1200 discloses determining if a single gateway is online, offline, experiencing a fault, etc. However, process 900 may be implemented by building server 504 in such a way that building server 504 determines if a plurality of gateways are online or offline.

At 1202, building server 504 can receive a heart-bit message from a second gateway. In some embodiments, building server 504 receives heat-bit messages from a plurality of gateways in a particular building. At 1204, building server 504 determines if a predefined amount of time has passed since receiving the heart-bit message for the second gateway. In various embodiments, building server 504 may record the amount of time since receiving a heart-bit message from each of a plurality of gateways. If the predefined amount of time has passed since receiving the heart-bit message from the second gateway, building server 504 may perform process 1206. If the predefined amount of time has not passed, building server 504 may perform process 1202.

At 1206, building server 504 sends a heart-bit request message to the second gateway. The heart-bit request message may prompt the second gateway to send the heart-bit message to building server 540. At 1208, building server 504 determines if the second gateway has replied to the heart-bit request message. In some embodiments, building server 504 waits a predefined amount of time before checking if the second gateway has sent the heart-bit message. In various embodiments, building server 504 "listens" for a response to the heart-bit message request and determines if building server 504 has received the heart-bit message from the second gateway within a predefined amount of time. If at 1208 building server 504 has received a heart-bit in response to the heart-bit request, building server 504 performs process 1202. If at 1208 building server 504 has not received the heart-bit message in response to the heart-bit request message, building server 504 performs step 1210.

At 1210, building server 504 selects a replacement for the second gateway from a plurality of gateways based on network and computing resources of each gateway. At 1210, building server 504 selects a first gateway as a replacement for the second gateway. Building server 504 may make this selection by determining a processing metric and a network metric for each of the plurality of gateways and determining a grade for each of the gateways based on the processing metric and the network metric. Building server 504 may select the gateway with the highest grade. The grade may indicate which gateway has the least amount of processing work to do and/or is transmitting the least amount of data to building server 504. Based on the selection of the first gateway to take over operations of the second gateway, building server 504 may update logical network representation 532 to indicate that the first gateway has taken over operations of the first gateway.

At 1212, building server 504 sends configuration data and a point subscription list for the devices managed by the second gateway to the first gateway. In some embodiments, building server 504 uses logical network representation 532 to determine what, if any, configuration data needs to be sent to the first gateway. In some embodiments, building server 504 identifies what devices are connected to the first gateway via logical network representation 532. Then, building server 504 can identify the software necessary for managing the devices. Building server 504 can determine if the first gateway has the necessary software for managing the devices and send any software to the first gateway that the first gateway will need to manage the devices that is not currently installed on the first gateway. The first gateway can install the configuration data and manage the devices of the second gateway based on the configuration data and the point subscription list of the second gateway. The first gateway can be configured to extract data for the first set of HVAC devices based on a first point list (e.g., a point list generated in process 800) and send the extracted data to building server 504. Further, the first gateway can extract data for the second set of HVAC devices based on the configuration data and the point subscription list received at 1212.

At 1214, building server 504 can check to see if the heart-bit message has been received from the second gateway. In some embodiments, building server 504 performs process 1214 periodically. In response to receiving the heart-bit from the second gateway, building server 504 can perform process 1214.

At 1214, building server 504 can send an updated point subscription list to the second gateway and cause the first gateway to stop managing the devices of the second gateway. Building server 504 may send a message to the first gateway causing the first gateway to stop managing the devices of the second gateway since at 1214, the second gateway was determined to be online. Further, building server 504 may retrieve an updated point subscription list from logical network representation 532 and send the updated point subscription list to the second gateway. The updated point subscription list may be any changes that were made to the point subscription list of the devices of the second gateway while the first gateway was managing the devices.

Figure 13:
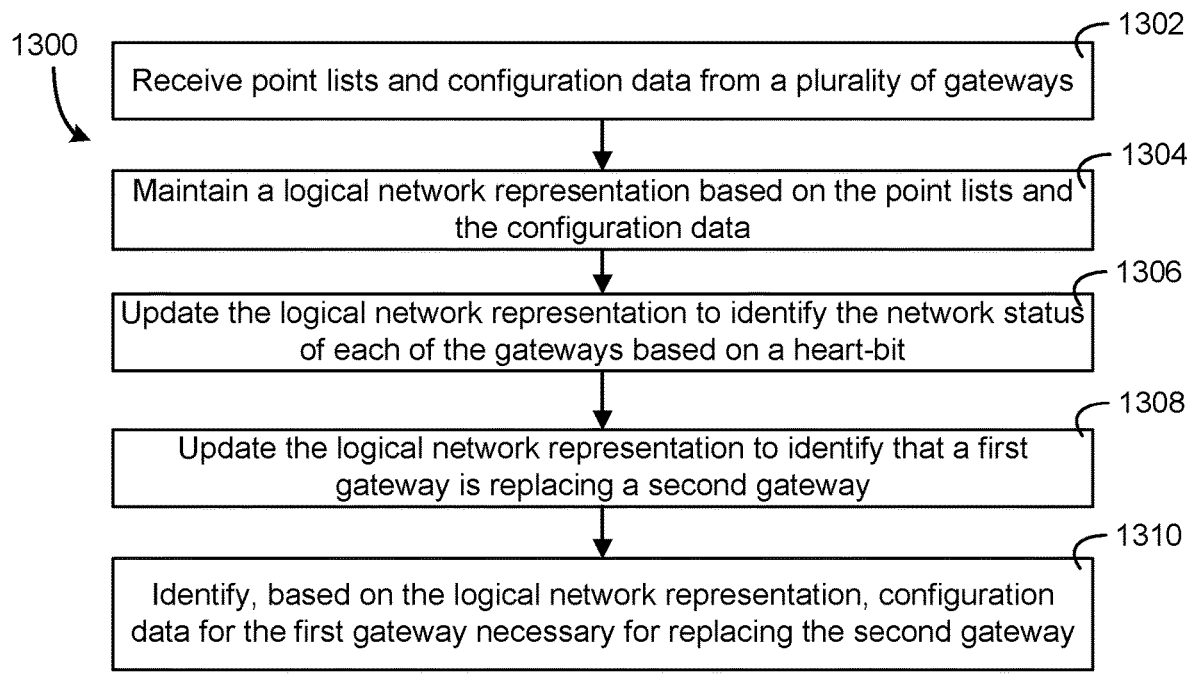
FIG. 13 is a flow diagram illustrating a process for maintaining a logical network representation by the building server of FIG. 5A, according to some embodiments.

Referring now to FIG. 13, a process 1300 for maintaining a logical network representation is shown, according to an exemplary embodiment. In some embodiments, building server 504 and/or gateways 502a-d are configured to perform process 1300. Further, the various components of building server 504 and/or gateways 502a-d can be configured to perform process 1300. At 1302, representation manager 528 can receive configuration data and point lists from gateways 502a-d. The configuration data (e.g., gateway configuration 629) may be the current software, such as drivers, installed on each of gateways 502a-d. The point lists (e.g., point list 627) may be the points for the devices which gateways 502a-d collect data for and/or send commands to. In some embodiments, representation manager 528 may receive data indicating the devices connected to each of gateways 502a-d (e.g., connected devices 631).

At 1304, representation manager 528 can maintain logical network representation 532 based on the information received at 1302. In some embodiments, representation manager 528 creates a new logical gateway (e.g., gateway 560 or gateway 568) if a new gateway communicates a point list, configuration data, and/or an indication of devices connected to the new gateway. In various embodiments, representation manager 528 updates logical network representation 532 based on the information received from gateways 502a-d if the data for one of the devices has changed.

At 1306, representation manager 528 can update a network status indicator for each of gateways 502a-d based on a heart-bit message. Receiving a heart-bit message is described with further reference to FIG. 12 and elsewhere herein. Maintaining a network status indicator may allow building server 504 to track which gateways of gateways 502a-d are connected to building server 504 and which gateways are unresponsive and/or not connected to building server 504.

At 1308, representation manager 528 can update logical representation 532 to indicate that a first gateway is replacing a second gateway, that is, a first gateway is managing the devices of a second gateway in response to determining that the second gateway is not connected to building server 504. Representation manager 528 may maintain an indication of which gateway the devices were originally managed by. This may allow building server 504 to consult logical network representation 532 to reallocate the management of the devices to the second gateway in response to determining that the second gateway has come back online.

At 1310, fault manager 526 can be configured to identify configuration data necessary for a first gateway replacing a second gateway based on logical network representation 532. Fault manager 526 can be configured to compare the configuration of the second gateway to the configuration of the first gateway to determine if there is any configuration data that the first gateway does not have that the second gateway does have. For example, if the first gateway has drivers A, B, and C while the second gateway has drivers A, B, C, and D, fault manager 526 can be configured to compare the first gateway to the second gateway to identify that the first gateway does not have driver D. Fault manager 526 may send driver D to the first gateway in response to determining that the first gateway does not have driver D and/or in response to determining that the first gateway is taking over managing the devices connected to the second gateway.

Referring now to FIG. 14A, gateway object 1300 is shown, according to an exemplary embodiment. Gateway object 1300 may be a JSON object and/or any other data structure which identifies the configuration of a particular gateway. Each of gateways 502a-d may store an object similar to gateway object 1300 (e.g., gateway configuration 629). In some embodiments, each of gateways 502a-d send an object similar to gateway object 1300 to building server

504. Gateway manager 518 can be configured to update logical network representation 532 based on the object. In some embodiments, logical network representation 532 can be configured to store the object, that is, the object may make up logical network representation 532 and/or server as a part of logical network representation 532.

Gateway object 1300 is shown to include unique identifier 1402 and signature 1404. Unique identifier 1402 may be a string and/or number which identifies a particular gateway. Signature 1404 may be a hashed value of all the attributes of gateway object 1300 (e.g., unique identifier 1402, description 1404, identifier 1408, etc.). A gateway may generate signature 1404 periodically to check if any changes have been made to the gateway and send signature 1404 to building server 504. Building server 504 can determine if signature 1404 matches a previously received signature. If the previously signature does not match a current signature, building server 504 can generate an alert. In some embodiments, the signature is generated remotely on building server 504. Generating a signature is described for points with respect to FIG. 6, FIG. 7, FIG. 8, and FIG. 10; however, this discussion can be applied to generating a signature for a gateway in addition to points.

Gateway object 1300 may further include a description 1406, an identifier 1408, a LAN address 1410, a subnet address 1412, a gateway address 1414 (e.g., a media access control (MAC) address), and a software version 1416 currently installed and running on the gateway. Gateway object 1300 may include addition information regarding a particular customer such as a customer name 1418, a customer site 1420 (e.g., a building identifier or a campus identifier), and a gateway version 1422. Further, gateway object 1300 may include statistical information regarding the gateway. Gateway object 1300 is shown to include a number of points in a point subscription 1424 and a data volume 1426 (e.g., the amount of data sent to building server 504 periodically).

Referring now to FIG. 14B, a point object 1430 for a particular data point is shown, according to an exemplary embodiment. Point object 1430 may be any kind of data point such as a BACnet point. Point object 1430 may be an object for a single point and/or multiple points. Point object 1 1432 may be a particular object for a single point. The point may have multiple properties. The properties may be an object identifier 1434, a description 1436, device type 1438, units 1440, and update interval 1442. These properties may be used when a gateway generates a signature for a particular data point and/or device. In various embodiments, point object 1430 is stored as part of a point subscription list on a gateway and/or is stored as part of logical network representation 532.

Figure 15:
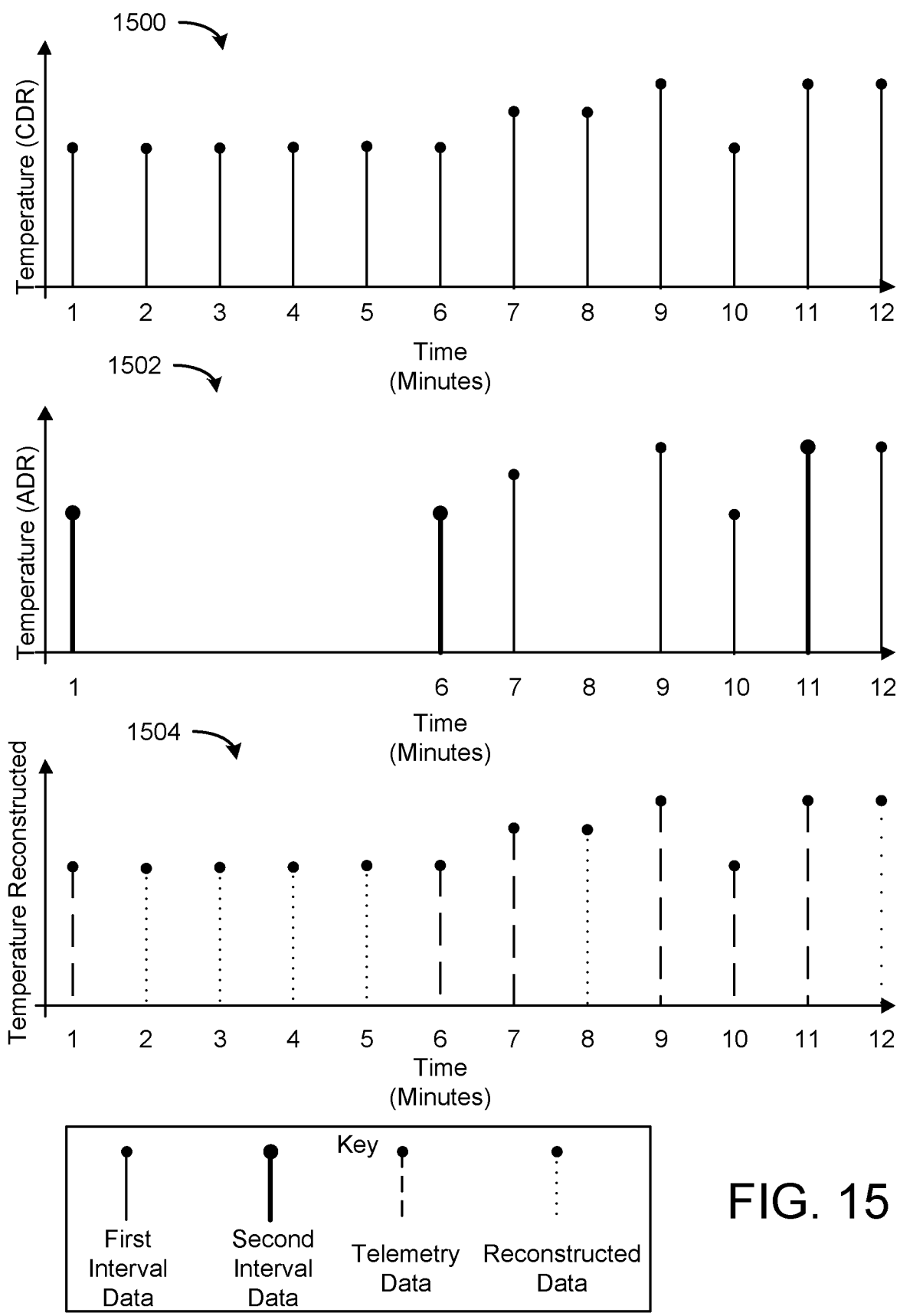
FIG. 15 is a set of graphs illustrating sending data from the gateways of FIGS. 2, 3, and 5 to the building server of FIG. 5A, according to some embodiments.

Referring now to FIG. 15, graphs 1500, 1502, and 1504 are shown to illustrate the sampling and data transmitting that can be performed by gateway 502a, according to some embodiments. Graphs 1500, 1502, and 1504 show temperature being sampled. However, it should be understood that any data (e.g., humidity, valve position, etc.) may be sampled and that temperature is used only to illustrate the functionality of gateway 502a. In some embodiments, the data sampling and transmitting can be performed by gateway controller 616 of gateway 502a as described with further reference to FIG. 6.

Graph 1500 illustrates the sampling of a particular data point at a first interval. Graph 1500 is labeled as a constant data rate (CDR) because it illustrates gateway controller 616 sampling temperature at the first interval, in this example, every minute. Graph 1502 is labeled as an adaptive data rate (ADR) because it illustrates gateway controller 616 transmitting the data to building server 504 when the data changes value and/or at a second interval, every six minutes and whenever the data changes value. Graph 1504 illustrates the reconstruction that building server 504 can be configured to generate based on the data received from gateway 502a.

Referring to graphs 1500, 1502, and 1504 cumulatively, it can be seen that the first interval occurs every minute of a particular data point. The data sent to building server 504 in graph 1502 is sent at one minute, six minutes, seven minutes, nine minutes, ten minutes, eleven minutes, and twelve minutes. The second interval occurs at one minute, six minutes and eleven minutes. In this regard, the second interval is every five minutes, an integer multiple of the first interval. The data sent to building server 504 at the first minute, the sixth minute, and the eleventh minute may be sent because the second interval expires and/or occurs at these times. The data sent to building server 504 at the seventh minute, the eighth minute, the ninth minute, the tenth minute, and the twelfth minute may be sent because the previous data points change value. For example, the data value of the sixth minute is less than the seventh minute. Even though the seventh minute does not occur at the second interval, the data has changed value so gateway 502a sends the data to building server 504. The data of the second minute, the third minute, the fourth minute, the fifth minute, the eighth minute, and the twelfth minute can be "assumed" by building server 504. Since building server 504 receives no data transmission at these times, building server 504 can determine that the data has not changed value and thus the building server 504 determines that the data of each "assumed" data point is the same as the previously recorded data point.

Figure 16:
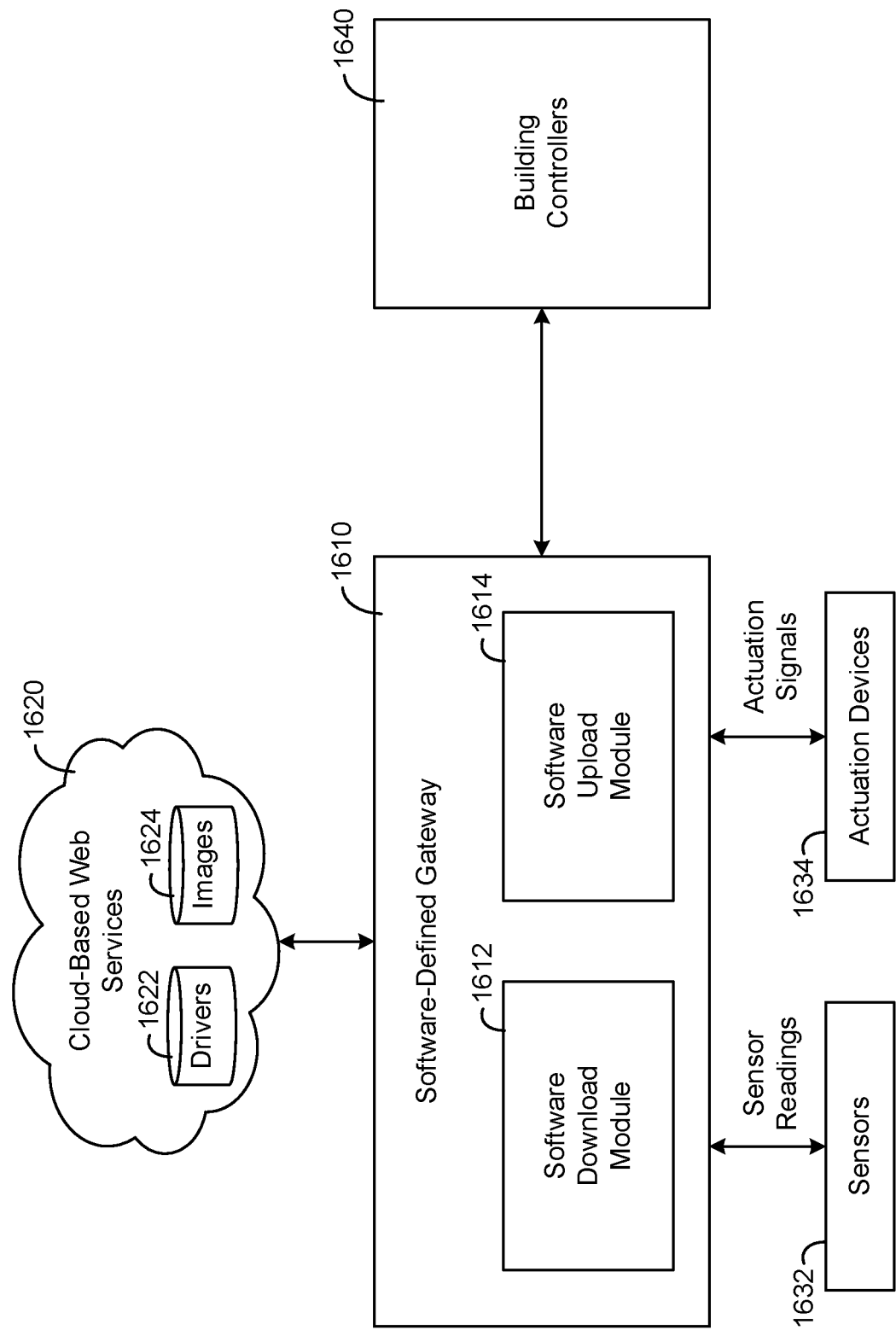
FIG. 16 is a block diagram of a software-defined gateway, according to some embodiments.

Referring now to FIG. 16, a block diagram of a software-defined gateway 1610 is shown, according to various embodiments. Software-defined gateway 1610 can be implemented in a variety of different ways. For example, software-defined gateway 1610 can be implemented on a physical device such as device 571 described above. For example, the software-defined gateway 1610 can be a software application loaded onto a computing device. Computing devices may be specific purpose gateway devices, laptop computers, desktop computers, local server computers, building controllers, and/or any other computing device. The software-defined gateway 1610, through the computing device, may have a physical connection to building equipment, e.g., via a LAN, e.g., and another physical connection to the cloud-based web services 1620 via the Internet. The physical network connections of a gateway device are described in greater detail elsewhere herein, for example, FIG. 2, FIG. 4, FIG. 5A, and FIG. 6. Via the connection to the equipment, the software-defined gateway 1610 can collect data. Via the connection to the cloud-based web services 1620, the software-defined gateway 1610 can push the collected data to the cloud-based web services 1620.

Software-defined gateway 1610 facilitates interconnectivity of building systems and devices. In some embodiments, software-defined gateway 1610 is a gateway device (e.g., gateway 206, gateway 502a) and the operation of the gateway device is defined by an image (i.e., state) that can be backed up to a server such as building server 504. The image can include configuration data (e.g., configuration 588), a point list (e.g., point list 590), and other information such as network information (e.g., IP address). The image can indicate various points assigned to the gateway, polling information for the points, subscription information for the points, an indication of the building equipment associated with the points, communication protocols for communicating with the points, and/or any other information.

As shown in FIG. 16, software-defined gateway 1610 is in communication with cloud-based web services 1620 (e.g., cloud platform 202, building server 504). Advantageously, a collection of device images 1624 can be maintained by cloud-based web services 1620. In the event that a physical gateway device malfunctions and needs to be replaced, a new physical device can be installed and placed online with minimal configuration effort. The new gateway device can simply retrieve an appropriate device image from cloud-based web services 1620 such that it operates as the prior device did. This functionality facilitates a more efficient workflow for device replacements as well as new device installs. As opposed to systems where new devices must be manually configured (e.g., via a hardware connection such as a USB connection), the ability to retrieve images 1624 from cloud-based web services 1620 can remove the need for more manual configuration efforts.

For example, cloud-based web services 1620 can receive and/or monitor heartbeat messages received from multiple software-defined gateways including the software defined gateway 1610. For example, cloud-based web services 1620 and/or the software defined gateways can perform the heartbeat based management described in FIG. 12 and elsewhere herein. The heartbeat messages can be used by cloud-based web services 1620 to determine whether one of the software gateways is experiencing a failure. Absence of a heartbeat message from a particular software gateway for a predefined amount of time may indicate that the particular software gateway has experienced a failure.

In response to one software defined gateway experiencing a failure, (e.g., network fault, crashing, power issue, etc.) a second software defined gateway can take over managing the points of equipment of the first software defined gateway. In some embodiment, cloud-based web services 1620 pushes an image of the first software defined gateway to the second software defined gateway. Based on the image, the second software defined gateway can manage (e.g., collect) points of the second software defined gateway. In some embodiments, the image identifies the building equipment, the points of the building equipment, the protocols used to communicate with the building equipment, and/or the network address of the first software gateway.

Cloud-based web services 1620 is also shown to maintain a collection of drivers 1622, a driver repository. For example, these drivers may be drivers such as BACnet drivers, Modbus drivers, and/or LonWorks drivers. Advantageously, these operations allows software-defined gateway 1610 to retrieve or be pushed drivers without having to maintain a large collection of drivers locally. Software-defined gateway 1610 is shown to include both a software download module 1612 and a software upload module 1614. Software download module 1612 can be configured to retrieve data from cloud-based web services 1620 such as drivers 1622 and images 1624.

The images 1624 can be images of multiple different software gateways stored in an image repository. The images 1624 can include an image for each active software gateway in a building. In some embodiments, the images 1624 include images for active and faulty software gateways of a building. In some embodiments, the images 1624 include a history of images for various software gateways, e.g., a backup history of images. Software upload module 1614 can be configured to transmit data to cloud-based web services 1620 (e.g., images, point list, etc.) as well as transmit data to sensors 1632, actuation devices 1634, and building controllers 1640 (e.g., control signals). Sensors 1632 can include any of the sensors described above (e.g., temperature sensors, flow sensors) and actuation devices 1634 can include any of the actuation devices described above. Moreover, building controllers 1640 can include any of the controllers described above.

Figure 17:
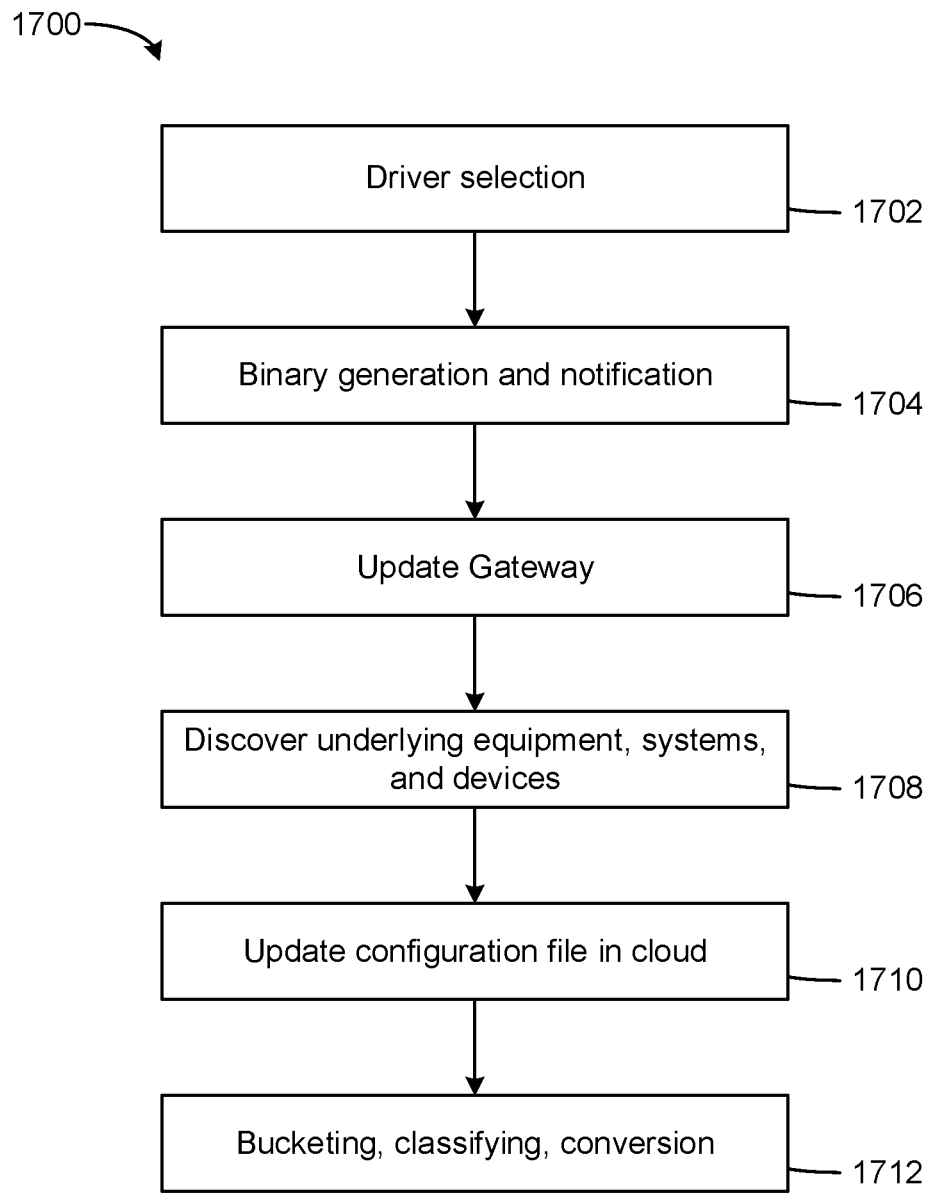
FIG. 17 is a flow diagram of a process retrieving drivers associated with the software-defined gateway of FIG. 16, according to some embodiments.

Referring now to FIG. 17, a flow diagram of a process 1700 for retrieving drivers from the cloud is shown, according to some embodiments. Process 1700 can be performed by software-defined gateway 1610 in conjunction with cloud-based web services 1620. Process 1700 allows software-defined gateway 1610 to retrieve (or be pushed) a variety of different drivers necessary for communication between building devices and networks. Process 1700 allows software-defined gateway 1610 to dynamically facilitate communication between such devices and networks such that manual driver installation and barriers to communication can be avoided.

Process 1700 is shown to include selecting an appropriate driver (step 1702). Software-defined gateway 1610 can be configured to identify an appropriate driver based on data received from sensors 1632, actuation devices 1634, or building controllers 1640. The data can be metadata describing points of the sensors 1632, actuation devices 1634, and/or the building controllers 1640. In some embodiments, the metadata describes the sensors 1632, the actuation devices 1634, and/or the building controllers 1640 themselves (e.g., type, model number, number of points, etc.). For example, software-defined gateway 1610 may identify that a BACnet driver is needed based on the format of a message received from a BACnet controller. In some embodiments, software-defined gateway 1610 may have an associated configuration file that allows it to make such a determination (e.g., configuration 588). Software-defined gateway 1610 may transmit a request to cloud-based web services 1620 indicating that a BACnet driver is needed. In some embodiments, the software-defined gateway 1610 can push the data received from the sensors 1632, the actuation devices 1634, and/or the building controllers 1640 to the cloud-based web services 1620. Based on the received data, the cloud-based web services 1620 can identify the appropriate one or more drivers and send the one or more drivers to the software-defined gateway 1610.

Process 1700 is also shown to include binary generation and notification (step 1704). Once the appropriate driver or drivers are identified, cloud-based web services 1620 can be configured to generate a binary message including the driver for transmission to software-defined gateway 1610. Cloud-based web services 1620 can then notify software-defined gateway 1610 and provide the driver to software-defined gateway 1610. Process 1700 is also shown to include updating the gateway (step 1706). For example, once the driver is received, the configuration of software-defined gateway 1610 can be updated (e.g., configuration 588) such that the driver can be used to communicate with connected devices.

Process 1700 is also shown to include discovering underlying equipment, systems, and devices (step 1708). Once the communication barrier is eliminated by means of the retrieved driver, software-defined gateway 1610 can be configured to detect and/or identify the underlying equipment, systems, and devices it has connected to. For example, software-defined gateway 1610 can discover that it has successfully connected to a BACnet controller, and the BACnet controller is responsible for controlling a variety of different HVAC devices. Software-defined gateway 1610 can be configured to determine a collection of data points associated with such equipment, systems, and devices that can be transmitted to cloud-based web services 1620.

Process 1700 is also shown to include updating a configuration file in the cloud (step 1710). For example, software upload module 1614 can be configured to transmit data about software-defined gateway 1610 (e.g., configuration and point list) that can be used to create a device image. In some embodiments, transmitting the data about the software-defined gateway 1610 to the cloud-based web services 1620 causes the cloud-based web services 1620 to generate the configuration file. In some embodiments, the software-defined gateway 1610 generates the configuration file locally and pushes the generated configuration file to the cloud-based web services 1620. Process 1700 is also shown to include bucketing, classifying, and conversion (step 1712). For example, cloud-based web services 1620 can process data received from software-defined gateway 1610 for a variety of purposes including those described above.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building device comprising one or more memory devices configured to store instructions thereon, that, when executed by one or more processors, cause the one or more processors to implement a software gateway, the software gateway configured to:
   receive one or more messages from building equipment connected to the software gateway;
   receive, based on the one or more messages, one or more software updates for the software gateway, wherein the one or more software updates are updates for communicating with the building equipment;
   communicate with the building equipment based on the one or more software updates and receive data describing the building equipment; and
   cause a configuration image to be generated for the software gateway based on the data describing the building equipment, the configuration image indicating a configuration of the software gateway for performing one or more gateway services for the building equipment.

2. The building device of claim 1, wherein the software gateway is configured to cause the configuration image to be generated by at least one of:
   generating the configuration image locally on the software gateway; or
   communicating the configuration of the software gateway to a server, wherein the server generates the configuration image based on the configuration of the software gateway.

3. The building device of claim 1, wherein the building equipment include at least one of building controllers, building sensor devices, or building actuator devices.

4. The building device of claim 1, wherein the one or more software updates are one or more communication protocol drivers for communicating with the building equipment via one or more communication protocols.

5. The building device of claim 1, wherein the configuration image includes at least one of a list of points of the building equipment assigned to the software gateway, a communication configuration for communicating with the building equipment, or a network address information of the software gateway.

6. The building device of claim 1, wherein the software gateway is configured to receive, based on the one or more messages, the one or more software updates by:
   identifying, based on the one or more messages, the one or more software updates; and
   retrieving, from a server, the one or more software updates identified based on the one or more messages.

7. The building device of claim 1, wherein the one or more pieces of building equipment are associated with one or more points;

wherein the software gateway is configured to:
receive, from a server, a second configuration image of a second software gateway, wherein the second software gateway has experienced a failure; and
manage, based on the second configuration image, one or more second points of one or more second pieces of building equipment in response to a reception of the second configuration image, wherein the second configuration image identifies the one or more second points.

8. The building device of claim 7, wherein the software gateway is configured to:
retrieve, based on the second configuration image, one or more second software updates; and
install the one or more second software updates;
wherein the software gateway is configured to manage the one or more second points of the one or more second pieces of building equipment based on the one or more second software updates.

9. The building device of claim 1, wherein the software gateway is configured to:
communicate the configuration image to a server, wherein the server includes an image repository including a plurality of configuration images of a plurality of software gateways.

10. The building device of claim 9, wherein the software gateway is configured to:
cause the server to update a previous configuration image of the software gateway stored in the image repository with the configuration image communicated to the server by the software gateway.

11. A method of a software gateway of a building implemented on one or more processing circuits, the method comprising:
receiving, by the software gateway, one or more messages from building equipment connected to the software gateway;
receiving, by the software gateway, based on the one or more messages, one or more software updates for the software gateway, wherein the one or more software updates are updates for communicating with the building equipment;
communicating, by the software gateway, with the building equipment based on the one or more software updates and receive data describing the building equipment; and
causing, by the software gateway, a configuration image to be generated for the software gateway based on the data describing the building equipment, the configuration image indicating a configuration of the software gateway for performing gateway services for the building equipment.

12. The method of claim 11, wherein causing, by the software gateway, the configuration image to be generated comprises at least one of:
generating the configuration image locally on the software gateway; or
communicating the configuration of the software gateway to a server, wherein the server generates the configuration image based on the configuration of the software gateway.

13. The method of claim 11, wherein the building equipment include at least one of building controllers, building sensor devices, or building actuator devices.

14. The method of claim 11, wherein the one or more software updates are one or more communication protocol drivers for communicating with the building equipment via one or more communication protocols.

15. The method of claim 11, wherein the configuration image includes at least one of a list of points of the building equipment assigned to the software gateway, a communication configuration for communicating with the building equipment, or a network address information of the software gateway.

16. The method of claim 11, wherein receiving, by the software gateway, the one or more software updates comprises:
identifying, based on the one or more messages, the one or more software updates; and
retrieving, from a server, the one or more software updates identified based on the one or more messages.

17. The method of claim 11, further comprising:
causing, by the software gateway, a server to update a previous configuration image of the software gateway stored in an image repository of the server with the configuration image communicated to the server by the software gateway.

18. The method of claim 11, wherein the one or more pieces of building equipment are associated with one or more points;
wherein the method further comprises:
receiving, by the software gateway, from a server, a second configuration image of a second software gateway, wherein the second software gateway has experienced a failure; and
managing, by the software gateway, based on the second configuration image, one or more second points of one or more second pieces of building equipment in response to a reception of the second configuration image, wherein the second configuration image identifies the one or more second points.

19. The method of claim 18, further comprising:
retrieving, by the software gateway, based on the second configuration image, one or more second software updates; and
installing, by the software gateway, the one or more second software updates;
wherein the software gateway is configured to manage the one or more second points of the one or more second pieces of building equipment based on the one or more second software updates.

20. One or more non-transitory computer storage medium configured to store instructions thereon, that, when executed by one or more processors, cause the one or more processors to implement a software gateway, the software gateway configured to:
receive one or more messages from building equipment connected to the software gateway;
receive, based on the one or more messages, one or more software updates for the software gateway, wherein the one or more software updates are updates for communicating with the building equipment;
communicate with the building equipment based on the one or more software updates and receive data describing the building equipment; and
cause a configuration image to be generated for the software gateway based on the data describing the building equipment, the configuration image indicating a configuration of the software gateway for performing gateway services for the building equipment.

* * * * *